(12) United States Patent
Ovens et al.

(10) Patent No.: US 11,409,271 B2
(45) Date of Patent: Aug. 9, 2022

(54) MONITORING AND CONFIRMING INFORMATION IN AN IMAGE

(71) Applicant: GE Aviation Systems LLC, Grand Rapids, MI (US)

(72) Inventors: Norman Leonard Ovens, Ada, MI (US); Michael Eric Figard, Rockford, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 914 days.

(21) Appl. No.: 15/607,407

(22) Filed: May 26, 2017

(65) Prior Publication Data

US 2018/0341254 A1   Nov. 29, 2018

(51) Int. Cl.
*G05B 23/02* (2006.01)
*G06K 9/62* (2022.01)
(Continued)

(52) U.S. Cl.
CPC ..... *G05B 23/0237* (2013.01); *G05B 23/0221* (2013.01); *G06F 11/0733* (2013.01);
(Continued)

(58) Field of Classification Search
CPC .... G06K 9/03; G06K 9/6292; G06K 2209/03; G06F 11/0784; G06F 11/0733; G06F 3/14; G05B 23/0237; G05B 23/0221; G09G 2330/12; G09G 2380/12; G09G 2340/10; G01C 23/00; G01C 23/005; G06T 15/005
See application file for complete search history.

(56) References Cited

U.S. PATENT DOCUMENTS 6,281,810 B1   8/2001   Factor
6,507,288 B2   1/2003   Block
(Continued)

FOREIGN PATENT DOCUMENTS

EP   2500693   9/2012

OTHER PUBLICATIONS

Extended European Search Report received for EP Patent Application Serial No. 18173397.3 dated Sep. 25, 2018, 8 pages.
(Continued)

*Primary Examiner* — Jianxun Yang
(74) *Attorney, Agent, or Firm* — Amin, Turocy & Watson, LLP

(57) ABSTRACT

Data presented in a visual image is monitored and verified. A processing component receives data from sensors and other sources, and interprets the data to generate processed data. A render component generates a visual image based on the processed data. A projector component projects the image, which is received by a splitter component that splits the light stream of the image and routes a portion of light energy to the display screen viewed by the user and another portion of the light energy to a data verification component (DVC). DVC interprets information presented in the image to determine the data being presented to the user by the image. DVC also receives the processed data from the processing component. DVC compares the data determined from the image to the processed data to determine whether they match and takes appropriate responsive action if they do not match.

20 Claims, 11 Drawing Sheets

(51) Int. Cl.
*G06V 10/98* (2022.01)
*G06F 11/07* (2006.01)

(52) U.S. Cl.
CPC ........ *G06F 11/0784* (2013.01); *G06K 9/6292* (2013.01); *G06V 10/98* (2022.01); *G06V 2201/02* (2022.01)

(56) References Cited

U.S. PATENT DOCUMENTS

| | | |
|---|---|---|
| 6,693,558 B2 | 2/2004 | Hedrick |
| 7,012,553 B2 | 3/2006 | Hedrick |
| 8,497,816 B2 | 7/2013 | Coloma et al. |
| 8,779,944 B2 | 7/2014 | Weinmann et al. |
| 8,878,941 B2 | 11/2014 | Anway et al. |
| 8,880,328 B2 | 11/2014 | Ovens et al. |
| 8,958,945 B2 | 2/2015 | Ovens |
| 9,202,098 B2 | 12/2015 | Lewis et al. |
| 9,546,002 B1 | 1/2017 | Azcuenaga et al. |
| 2004/0046712 A1* | 3/2004 | Naimer ................ G06F 3/14 345/9 |
| 2005/0276514 A1* | 12/2005 | Fisher ................ G06T 7/001 382/286 |
| 2007/0236366 A1 | 10/2007 | Gur et al. |
| 2009/0027523 A1* | 1/2009 | Chang ................ H04N 9/3182 348/254 |
| 2011/0149067 A1* | 6/2011 | Lewis ................ B64D 47/08 348/135 |
| 2014/0320827 A1* | 10/2014 | Grundhofer ......... H04N 9/3194 353/69 |
| 2015/0015422 A1 | 1/2015 | Michaels |

OTHER PUBLICATIONS

Communication pursuant to Rule 69 EPC received for EP Patent Application Serial No. 18173397.3 dated Dec. 3, 2018, 2 pages.
First Office Action received for Canadian Patent Application Serial No. 3,005,181 dated Mar. 19, 2019, 6 pages.
Communication pursuant to Article 94(3) EPC received for EP Patent Application Serial No. 18173397.3 dated Apr. 20, 2020, 6 pages.
Second Office Action received for Canadian Patent Application Serial No. 3,005,181 dated Jan. 23, 2020, 6 pages.

* cited by examiner

MONITORING AND CONFIRMING INFORMATION IN AN IMAGE

TECHNICAL FIELD

This disclosure relates generally to information processing, e.g., to monitoring and confirming information in an image.

BACKGROUND

Various types of vehicles (e.g., aircraft, ships, trains, automobiles), power plants (e.g., nuclear and/or other types of power plants), and/or medical systems or procedures can utilize visual images to present data relating to the vehicle, power plant, or medical system or procedure to a user. Accuracy of the data presented in the visual images can be important, as inaccurate data may result in the user making a mistake in connection with operation of the vehicle, power plant, or medical system, or performance of the medical procedure. This may result in loss of life, injury to the user and/or other persons, damage to the vehicle, power plant, or medical system, and/or damage to other property.

The above-described description is merely intended to provide a contextual overview relating to information processing, and is not intended to be exhaustive.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with a non-limiting, example implementation, a method can comprise, with regard to respective visual images relating to an event, determining, by a system comprising a processor, data associated with a visual image of the respective visual images being presented via a display screen, based at least in part on results of analyzing and interpreting the visual image. The method also can comprise determining, by the system, whether the data associated with the visual image satisfies a defined threshold level of accuracy based at least in part on a comparison result of comparing the data associated with the visual image to processed data that was used to facilitate generating the visual image, in accordance with a defined accuracy criterion.

In accordance with another non-limiting, example implementation, a system can include a memory that stores computer-executable components, and a processor that executes computer-executable components stored in the memory. The computer executable-components can comprise a data processing component that generates processed data based at least in part on sensor data received from one or more sensors, wherein a visual image of a set of visual images is generated based at least in part on the processed data. The computer executable-components also can include a data verification component that determines data represented in the visual image based at least in part on results of an analysis and interpretation of the visual image, wherein the data verification component determines whether the data represented in the visual image is accurate with respect to the processed data based at least in part on a comparison result of a comparison of the data represented in the visual image to the processed data, in accordance with a defined accuracy criterion.

In accordance with still another non-limiting, example implementation, a machine-readable medium can comprise executable instructions that, when executed by a processor, facilitate performance of operations. The operations can comprise generating processed data based at least in part on analyzing and interpreting sensor data received from one or more sensors. The operations also can comprise identifying data represented in a visual image of respective visual images being presented for display via a display screen, based at least in part on results of analyzing and interpreting the visual image, wherein the visual image is generated based at least in part on the processed data. The operations further can include determining whether the data represented in the visual image is accurate with respect to the processed data based at least in part on a comparison result of comparing the data represented in the visual image to the processed data, in accordance with a defined accuracy criterion.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
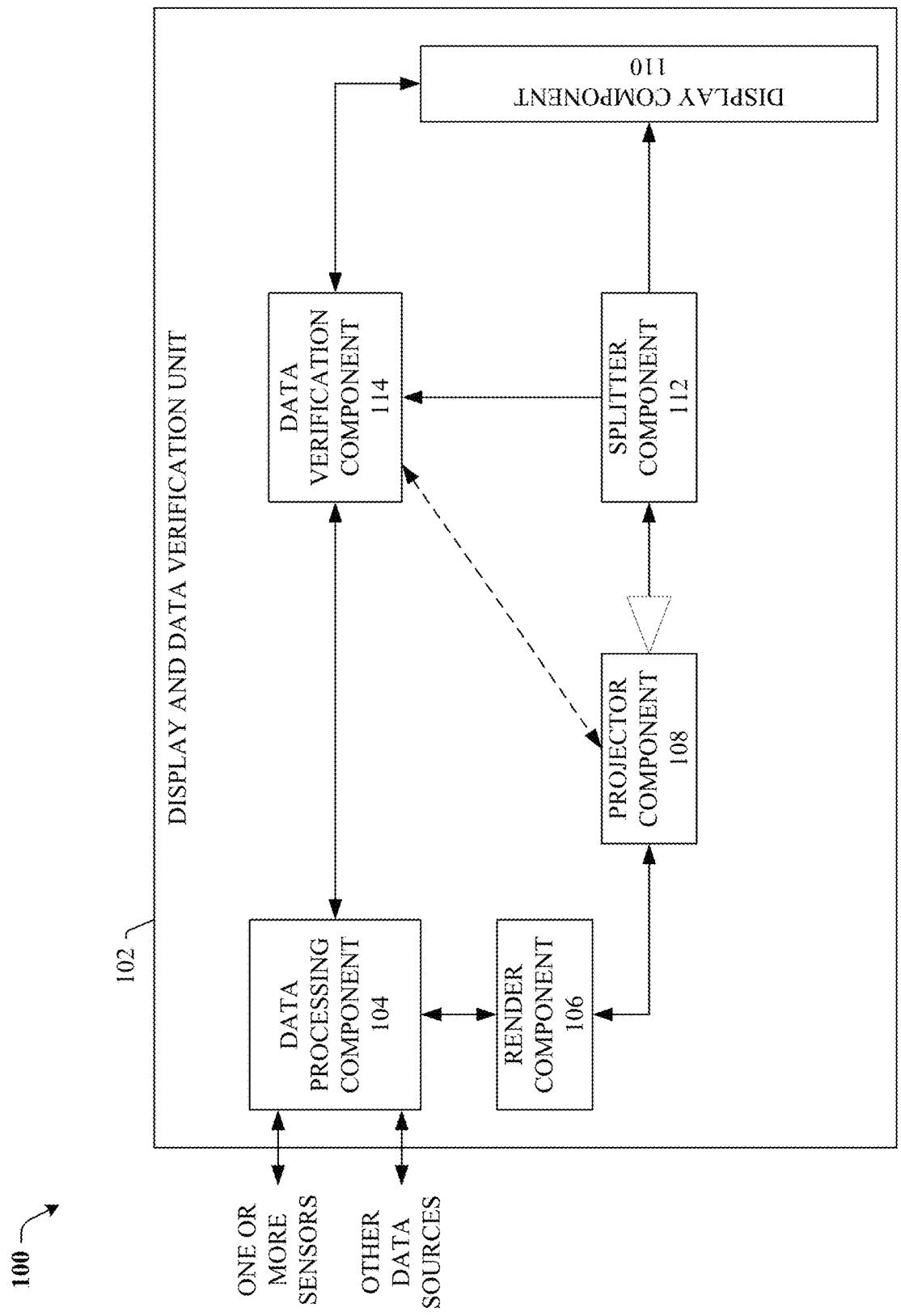
FIG. 1 illustrates a block diagram of an example system that can monitor and verify data in a visual image for accuracy, in accordance with one or more embodiments of the disclosed subject matter.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure might be practiced without these specific details, or with other methods, components, materials, etc. In other instances, well-known structures and devices are shown in block diagram form to facilitate describing one or more aspects.

Various types of vehicles (e.g., aircraft, ships, trains, automobiles), power plants (e.g., nuclear and/or power plants), and/or medical systems or procedures can utilize visual images to present data relating to the vehicle, power plant, or medical system or procedure to a user. Accuracy of the data presented in the visual images can be important, as inaccurate data may result in the user making a mistake in connection with operation of the vehicle, power plant, or medical system, or performance of the medical procedure. This may result in loss of life, injury to the user and/or other persons, damage to the vehicle, power plant, or medical system, and/or damage to other property.

For example, one of the safety challenges of a current aircraft flight deck is to be able to ensure that the data the flight crew is seeing is correct. This can be particularly important with critical data that potentially could cause loss of life, injury, damage to or loss of aircraft, and/or damage to or loss of other property, if the data presented to the flight crew is incorrect. Current systems have mechanisms to verify the data in the system is correct all the way up to a point just before the image with the data is created and presented to the flight crew. Currently, there is no feasible way to verify that, once an image is rendered, the image displayed to the flight crew has data that matches the data that was intended to be displayed to the flight crew. The current systems depend on a second instrument, electronic monitor, or pilot to cross-check critical data to verify and ensure that such data is accurate.

The disclosed subject matter can employ techniques for monitoring and verifying data presented in a visual image. A data processing component can receive data (e.g., sensor data and/or other data) from sensors and/or other sources (e.g., an external system). The data processing component can analyze and interpret the data to generate processed data based at least in part on results from the analyzing and interpreting of the data. A render component can receive the processed data from the data processing component and can generate a visual image based at least in part on the processed data, which can comprise all or a portion of the data and/or other data that was determined by the data processing component based at least in part on the data. The render component can provide (e.g., communicate) the visual image to a projector component. The projector component can project the visual image.

The visual image projected by the projector component can be received by a splitter component that can split the light stream of the visual image and route most of the light energy of the light stream to a display screen for presentation of the visual image to a user and a relatively smaller portion of the light energy to a data verification component. The data verification component can analyze and interpret the visual information presented in the visual image. The data verification component can determine or identify the data being presented in the visual image to the user based at least in part on the results of the analyzing and interpreting of the visual information presented in the visual image. The data verification component also can receive the processed data from the data processing component.

The data verification component can compare the data determined from the visual information presented in the visual image to the processed data to determine whether the data determined from the visual image matches the processed data. If the data verification component determines that the data determined from the visual image matches the processed data, the data verification component can determine that the visual information presented in the visual image accurately represents the processed data. If the data verification component determines that the data determined from the visual image does not match the processed data, the data verification component can take appropriate responsive action to correct or mitigate the error in the data presented in the visual image. For example, in response to determining that the data determined from the visual image does not match the processed data, the data verification component can communicate a notification message (e.g., a visual notification message) to the display screen for presentation to the user to notify the user of the error in the data presented in the visual image, can communicate a visual or audio alarm to the user, and/or can prevent all or a portion (e.g., portion comprising the error in data) of the visual image from being displayed on the display screen.

In some embodiments, instead of using a projector component to project the visual image on the display screen, a display component, such as a liquid crystal display (LCD) or light emitting diode (LED) display, can be employed to present the visual image to the user. The display component can comprise a sensor component (e.g., a sensor matrix) that can be integrated with the display matrix of the display component. The render component can communicate the visual image to the display component. The sensor component can detect the visual information being presented in the visual image displayed on the display component via the display matrix.

The data verification component can receive the visual information of the visual image from the sensor component. The data verification component can analyze and interpret the visual information. Based at least in part on the results of the analyzing and interpreting of the visual information, the data verification component can determine or identify the data being presented in the visual image to the user. The data verification component also can receive the processed data from the processing component. The data verification component can compare the data determined from the visual information presented in the visual image to the processed data to determine whether the data determined from the visual image matches the processed data. If an error is detected in the data presented in the visual image, the data verification component can take appropriate responsive action (e.g., present a notification message, present an alarm, and/or prevent display of all or a portion of the visual image, . . . ), as more fully disclosed herein.

The disclosed subject matter can enable verification of the data all the way to the point of being able to verify the data being presented in the visual image on the display screen. This can provide increased reliability of the system, a reduction of redundant systems that have been employed to compensate for the lack of integrity in the presentation of data (e.g., critical data) via a display screen. The disclosed subject matter also can replace complex and complicated monitors that are currently used to facilitate verifying data.

These and other aspects of the disclosed subject matter are described with regard to the figures.

FIG. 1 illustrates a block diagram of an example system 100 that can monitor and verify data in a visual image for accuracy, in accordance with one or more embodiments of the disclosed subject matter. Generally, systems (e.g., system 100) detailed herein can comprise one or more processors and one or more memories (e.g., one or more data stores) that can store executable instructions. The instructions, when executed by a processor of the one or more processor, can facilitate performance of operations detailed herein. Examples of the one or more memories and one or more processors can be found with reference to FIG. 9. It is to be appreciated that the computer 912 can represent a suitable computing device that can be used in connection with implementing one or more of the systems or components shown and described in connection with FIG. 1 and other figures disclosed herein and/or the systems or components disclosed herein can comprise the computer 912. Moreover, systems detailed herein or components thereof can be employed to use hardware and/or software to solve problems that are highly technical in nature (e.g., related to vehicles (e.g., aircraft, ship, train, automobile, . . . ), power plants (e.g., nuclear or other types of power plants), medical systems, etc.), that are not abstract and that cannot be performed as a set of mental acts by a human. For example, in some embodiments, certain determinations performed by components detailed herein can be based on very large data sets that mental acts by a human cannot solve sufficiently quickly to be as useful as otherwise. Furthermore, in some embodiments, certain solutions or determinations of components detailed herein can provide significant improvements to certain technological fields or domains such as technological domains relating to vehicles, power plants, medical systems, etc.

In some embodiments, the system 100 can comprise display and data verification unit 102 that can present (e.g., display) data to a user and can verify the data being presented to the user, wherein the data can relate to one or more events that can be occurring with respect to the system 100. The data can comprise information in the form of alphanumeric characters (e.g., letters, words, numbers, . . . ), visual images comprising visual objects (e.g., roads, runways, train tracks, vehicles, buildings, engines, . . . ), colors (e.g., color coding or colored data indicators), etc. The system 100 can relate to and be employed to facilitate operation of, for example, vehicles (e.g., aircraft, ship, train, automobile, . . . ), power plants (e.g., nuclear or other types of power plants), medical systems, or other types of systems or devices.

The display and data verification unit 102 can comprise a data processing component 104 that can receive data (e.g., sensor data and/or other data) from one or more sensors and/or other sources, such as an external system (e.g., an external aircraft system). Depending in part on the type of system involved, the sensor data can comprise, for example, data relating to vehicle speed or acceleration, direction of travel of a vehicle, location of a vehicle, orientation of a vehicle, altitude of a vehicle, air pressure of ambient air, air pressure inside cabin of a vehicle, wind speed and direction, ambient temperature, temperature inside cabin of a vehicle, vehicle-related parameters, engine parameters (e.g., engine temperature, engine revolutions per minute (RPMs), . . . ), power plant components, power generation, power-related parameters, medical systems, operation parameters of medical equipment, or patient statistics (e.g., vital statistics) or parameters from medical sensors on patient, etc. Depending in part on the type of system involved, the other data from other sources can comprise, for example, data relating to a vehicle and operation of the vehicle received from vehicle traffic control (e.g., air traffic control, train traffic control, vessel traffic control, . . . ) or other vehicle-related systems, data relating to power plants received from other power plant systems, or data relating to medical systems or procedures receive from other medical systems, etc.

The data processing component 104 can analyze and interpret the received data, and can generate processed data that is determined based at least in part on results from the analyzing and interpreting of the received data. For example, the data processing component 104 can analyze and interpret sensor data relating to altitude of an aircraft to determine and generate visual information that can be used to generate a visual image that can accurately depict the altitude of the aircraft and/or other information (e.g., alphanumeric characters) that can indicate the altitude of the aircraft. As another example, the data processing component 104 can analyze and interpret sensor data relating to the direction of the aircraft and/or other data (e.g., data from an external aircraft system) relating to the location and orientation of a runway at an airport to determine and generate visual information that can be used to generate a visual image that can accurately illustrate the, position, direction, and/or orientation of the aircraft with respect to (e.g., in relation to; as compared to) the location and orientation of the airport runway.

The display and data verification unit 102 can include a render component 106 that can be associated with (e.g., communicatively connected to) the data processing component 104. The render component 106 can receive the processed data from the data processing component 104 and can generate visual images based at least in part on the processed data, which can comprise all or a portion of the data received from the sensors or other sources and/or other data that was determined by the data processing component 104 based at least in part on the data received from the sensors or other sources.

In some embodiments, the display and data verification unit 102 can comprise a projector component 108 that can be associated with the render component 106. The render component 106 can provide (e.g., communicate) visual images to the projector component 108 to facilitate presentation (e.g., display) of the visual images.

The display and data verification unit 102 also can include a display component 110 (e.g., a display screen) that can be associated with the projector component 108. The projector component 108 can project the visual images towards a display component 110. For instance, the projector component 108 can generate a light stream (e.g., a visual light stream) that can comprise light energy and can represent the visual images. The display component 110 can be aligned with an emitter component (e.g., projector lens) of the projector component 108 from which the light stream is emitted to enable the light stream, or portion thereof, to interact with a display screen of the display component 110 to display the visual images on the display screen of the display component 110.

In certain embodiments, the display component 110 can comprise a front projection display screen, wherein the projector component 108 can project the visual images towards the front of the display screen of the display component 110. In other embodiments, the display component 110 can comprise a rear projection display screen, wherein the projector component 108 can project the visual images towards the rear end of the display screen of the display component 110.

The display and data verification unit 102 further can comprise a splitter component 112 that can be positioned between, and aligned with, or at least substantially aligned with, the projector component 108 and the display component 110. For instance, a receiver component of the splitter component 112, which can receive the light stream from the projector component 108, can be aligned with, or at least substantially aligned with, the emitter component (e.g., projector lens) of the projector component 108. An emitter component of the splitter component 112, which can emit the light stream, or portion thereof, can be aligned with, or at least substantially aligned with, the display component 110. The display and data verification unit 102 also can include a data verification component 114 that can be associated with the splitter component 112, wherein another of the emitter components of the splitter component 112 can be aligned with the data verification component 114 (e.g., an optical monitor component of the data verification component 114).

The splitter component 112 can receive the light stream, comprising the visual images, being projected by the projector component 108. The splitter component 112 can split (e.g., divide, apportion, or allocate) the light stream to generate a larger portion of the light stream that can comprise most of the light energy of the light stream and a relatively smaller portion of the light stream that can include a relatively smaller amount of the light energy. The splitter component 112 can route the larger portion of the light energy of the light stream to the display component 110 for presentation of the visual images to a user, wherein the display component 110 can receive the larger portion of the light stream and can present visual images to the user based at least in part on the larger portion of the light stream. The splitter component 112 can route the relatively smaller portion of the light energy of the light stream to the data verification component 114 for analysis and verification of the visual images contained in the light stream by the data verification component 114.

With respect to each visual image of the visual images contained in the light stream, the data verification component 114 can analyze and interpret the visual information presented in the visual image. The data verification component 114 can determine or identify the data being presented in the visual image to the user based at least in part on the results of the analyzing and interpreting of the visual information presented in the visual image.

For instance, the data verification component 114 can employ optical recognition techniques and algorithms and/or computer-based vision techniques to analyze and interpret the visual information contained in the visual image to identify objects, shapes of objects, alphanumeric characters, data values, colors, symbols, and/or other information contained in the visual image, and to determine the data (e.g., underlying data) of the visual image that resulted in the visual image having its particular visual form. The data verification component 114 can essentially reverse engineer the visual image to determine the data basis for the development of the details of the visual image.

Figure 2:
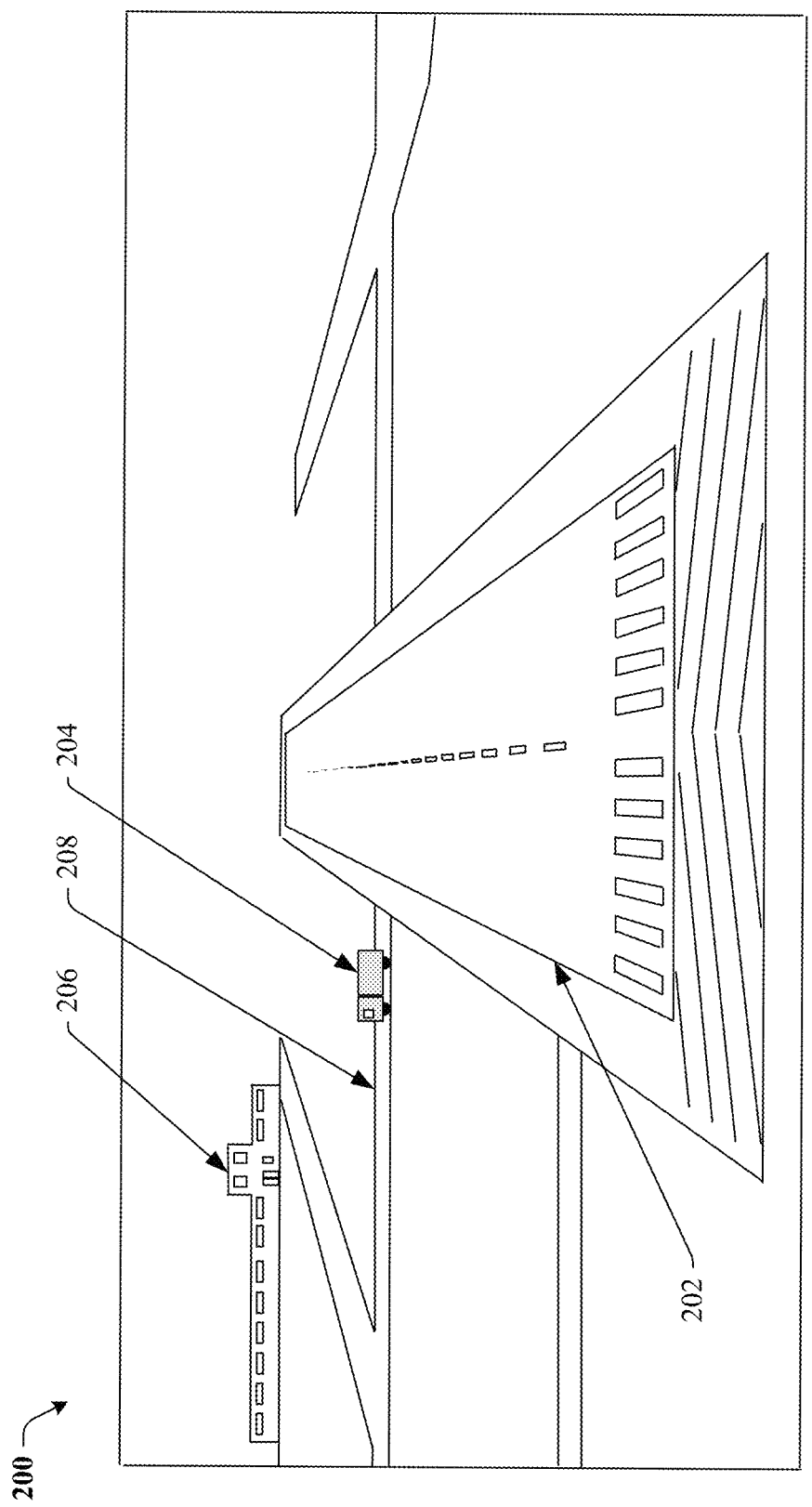
FIG. 2 presents a diagram of an example visual image, in accordance with various embodiments and implementations of the disclosed subject matter.

Referring briefly to FIG. 2 (along with FIG. 1), FIG. 2 presents a diagram of an example visual image 200, in accordance with various embodiments and implementations of the disclosed subject matter. The visual image 200 can depict a view of a runway 202 from the viewing perspective of an aircraft. With further regard to the altitude example disclosed herein, the data verification component 114 can analyze and interpret the visual image 200, which can comprise a depiction of a runway 202 to identify the runway 202 and other objects (e.g., truck 204, building 206, road 208, . . . ) in the visual image 200, including the relative sizes, shapes, and other characteristics of the runway 202 and other objects in the visual image 200. In some instances, the data verification component 114 also can have information indicating the dimensions of the runway 202, buildings (e.g., building 206), or other objects associated with the runway 202. The data verification component 114 can analyze and interpret the relative size(s), shape(s), and other characteristics (e.g., angle of view of the runway 202 relative to the aircraft) of the runway 202 and/or other objects in the visual image 200, and can determine the altitude of the aircraft with respect to the runway 202 based at least in part on the results of the analysis and interpretation of the relative size(s), shape(s), and other characteristics of the runway 202 and/or other objects in the visual image 200. In some implementations, the visual image 200 also can include alphanumeric characters or other information (not shown in FIG. 2) that can provide the altitude data value. In such instances, the data verification component 114 can recognize and interpret the altitude data value presented in the visual image 200 to determine the altitude of the aircraft.

As another example, with regard to the location and orientation example disclosed herein, the data verification component 114 can analyze and interpret the visual image 200 to identify the runway 202 and other objects (e.g., truck 204, building 206, . . . ) in the visual image, including the relative sizes, shapes, locations, orientations, and other characteristics of the runway 202 and other objects in the visual image 200. The data verification component 114 can analyze and interpret the relative size(s), shape(s), location(s), orientation(s), and other characteristics (e.g., angle of view of the runway 202 relative to the aircraft) of the runway 202 and/or other objects in the visual image 200, and can determine the location and orientation of the runway 202 at the airport and the position, direction, and/or orientation of the aircraft with respect to the runway 202 based at least in part on the results of the analysis and interpretation of the relative size(s), shape(s), location(s), orientation(s), and other characteristics of the runway 202 and/or other objects (e.g., truck 204, building 206, . . . ) in the visual image 200. In some implementations, the visual image 200 also can include alphanumeric characters or other information (not shown in FIG. 2) that can provide the data values that can indicate the location and/or orientation of the runway 202. In such instances, the data verification component 114 can recognize and interpret those data values presented in the visual image 200 to determine the location and/or orientation of the runway 202 and the position, direction, and/or orientation of the aircraft with respect to the runway 202.

With further regard to FIG. 1, the data verification component 114 also can be associated with (e.g., communicatively connected to) the data processing component 104. The data verification component 114 can receive the processed data, and/or the data received from the one or more sensors or other sources, from the data processing component 104.

The data verification component 114 can analyze and evaluate the data determined or derived from the visual information of the visual image and the processed data and/or other data (e.g., data received from sensors or other sources) that was used to generate the visual image to facilitate determining the accuracy of the data contained in the visual image. For instance, the data verification component 114 can compare the data determined or derived from the visual information of the visual image with the processed data and/or other data to determine whether the data of the visual image matches, or at least substantially (e.g., acceptably or suitably) matches, the processed data and/or other data, in accordance with defined matching criteria (e.g., determine whether the comparison results satisfy the defined matching criteria). For example, based at least in part on the comparison results, the data verification component 114 can determine whether the data represented in or derived from the visual image satisfies a defined threshold level of accuracy (e.g., is accurate or is sufficiently accurate enough to satisfy a minimum threshold level of accuracy), in accordance with defined accuracy criteria, which can comprise the defined matching criteria.

If the data verification component 114 determines that the data determined or derived from the visual image matches or at least sufficiently matches the processed data and/or the other data, in accordance with the defined matching criteria, the data verification component 114 can determine that the visual information presented in the visual image accurately represents the processed data and/or the other data. In such instance, the data verification component 114 can determine that no responsive action with respect to the visual image is to be taken.

If the data verification component 114 determines that the data determined from the visual image does not desirably (e.g., acceptably or suitably) match the processed data, in accordance with the defined matching criteria, the data verification component 114 can take appropriate responsive action to correct or mitigate the error in the data presented in the visual image. For example, in response to determining that the data determined from the visual image does not match the processed data and/or the other data, the data verification component 114 can generate a notification message (e.g., a visual notification message) and can communicate the notification message to the display component 110 for presentation to the user to notify the user of the error in the data presented in the visual image, or can communicate the notification message to the projector component 108, wherein the projector component 108 can project the notification message to the display component 110 for presentation to the user. As another example, additionally or alternatively, the data verification component 114 can generate a visual or audio alarm and can communicate the visual or audio alarm to the user (e.g., via the display component 110 and/or the projector component 108). As still another example, additionally or alternatively, the data verification component 114 can prevent all or a portion (e.g., portion comprising the error in data) of the visual image from being displayed by the display component 110 via a prevention message communicated by the data verification component 114 to the projector component 108 and/or the display component 110 to direct (e.g., instruct) the projector component 108 and/or the display component 110 to not display, or to stop (e.g., cease, discontinue) displaying, the visual image or subsequent visual images that contain erroneous data.

Figure 3:
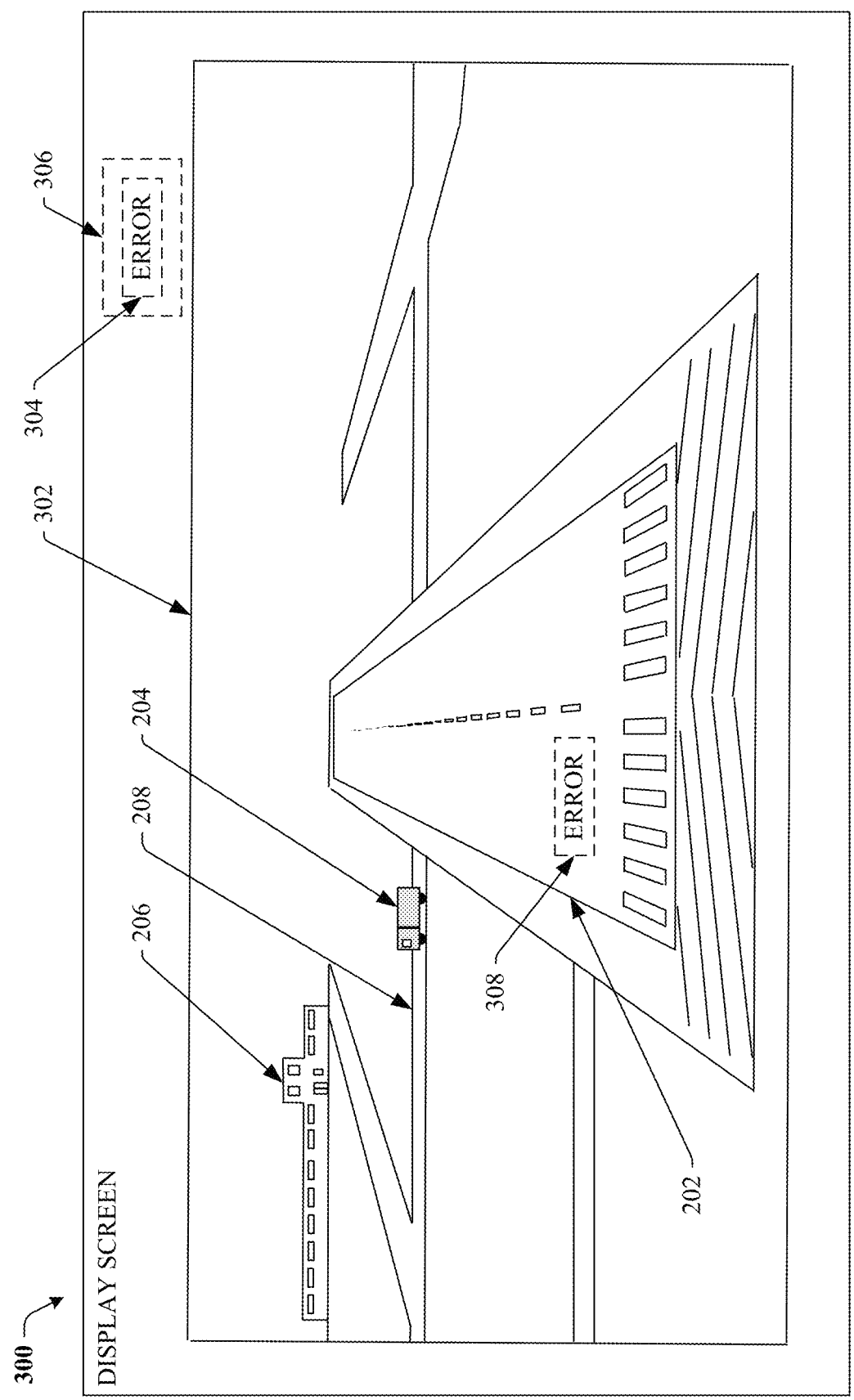
FIG. 3 illustrates a diagram of an example display screen that presents a visual image and an error indicator(s) that can indicate a data error(s) in the visual image, in accordance with various embodiments and implementations of the disclosed subject matter.

Referring briefly to FIG. 3 (along with FIG. 1), FIG. 3 illustrates a diagram of an example display screen 300 that presents a visual image and an error indicator(s) that can indicate a data error(s) in the visual image, in accordance with various embodiments and implementations of the disclosed subject matter. The visual image 302 presented by the example display screen 300 of the display component 110 can depict a view of a runway 202 from the viewing perspective of an aircraft.

If the data verification component 114 determines that certain data determined from the visual image 302 does not desirably (e.g., acceptably or suitably) match the processed data (e.g., if the data verification component 114 determines that there is an error with regard to the certain data), in accordance with the defined matching criteria, the data verification component 114 can take appropriate responsive action to correct or mitigate the error in the certain data presented in the visual image 302. For instance, in response to determining that there is an error(s) in the data in the visual image 302, the data verification component 114 can generate one or more error indicators and can communicate the one or more error indicators to the display component 110 for presentation to the user to notify the user that there is an error(s) in the data contained in the visual image 302. In response to receiving an error indicator from the data verification component 114, the display component 110 can present an error notification indicator 304, which can be located in a portion 306 of the display screen 300 that can be reserved for presenting error notifications to the user. Additionally or alternatively, in response to receiving an error indicator from the data verification component 114, the display component 110 can present an error notification indicator 308, which can be located in the part of the visual image 302 that relates to an object (e.g., runway 202) in the visual image 302 associated with the error detected in the data.

While the example display screen 300 depicts error notification indicators that state the word "error," in accordance with various embodiments, the data verification component 114 can generate various different types of indicators that can indicate errors in data associated with a visual image, wherein the various different types of indicators can provide different levels of detail regarding the data errors, can employ different color schemes to indicate and differentiate different types of data errors or potential errors. For example, the data verification component 114 can generate, and communicate to the display component 110, an error indicator or message that can specify that the location data relating to the location of the runway with respect to the aircraft is in error, and the display component 110 can present, on the display screen 300, an error notification message that can specify that the location data relating to the location of the runway 202 with respect to the aircraft is in error.

As another example, the data verification component can generate, and communicate to the display component 110, an error indicator that can have one color (e.g., red) to indicate data in the visual image 302 is in error, another color (e.g., yellow) to indicate that certain data in the visual image 302 may be in error or is unverified (e.g., indicate a lower level of confidence in the accuracy of the certain data). The display component 110 can present, on the display screen 300, the error indicator, which can have the appropriate color to indicate the level of reliability or confidence in the data (e.g., certain data) being presented in the visual image 302.

Figure 4:
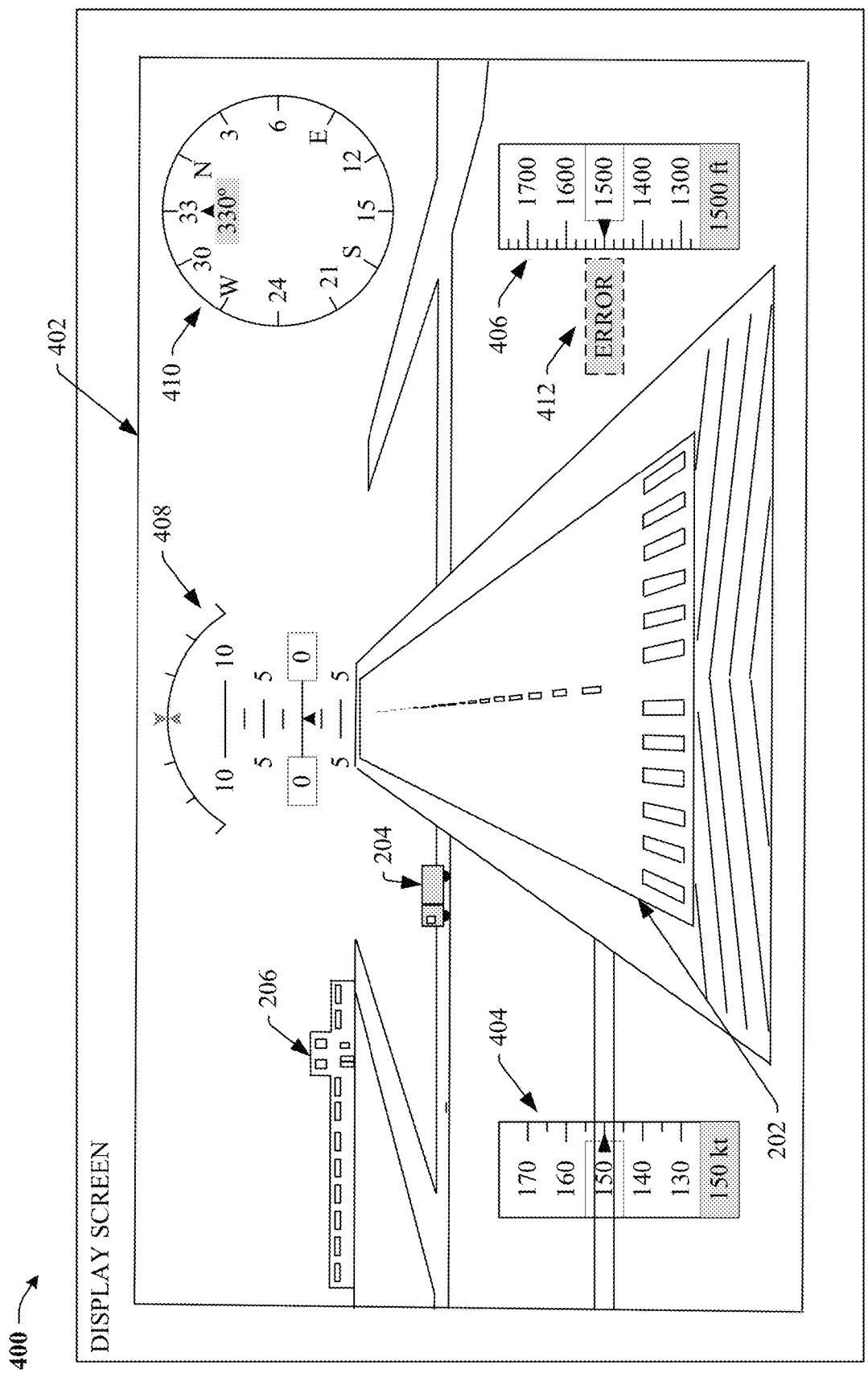
FIG. 4 depicts a diagram of an example display screen that can present a visual image, a data overlay, and/or an error indicator(s) that can indicate a data error(s) in the visual image, in accordance with various embodiments and implementations of the disclosed subject matter.

Turning briefly to FIG. 4 (along with FIG. 1), FIG. 4 depicts a diagram of an example display screen 400 that can present a visual image, a data overlay, and/or an error indicator(s) that can indicate a data error(s) in the visual image, in accordance with various embodiments and implementations of the disclosed subject matter. The visual image 402 presented by the example display screen 400 of the display component 110 can depict a view of the runway 202 from the viewing perspective of an aircraft being operated by one or more users (e.g., pilot, co-pilot, . . . ).

As more fully described herein, the data verification component 114 can receive or sense the visual image 402, and/or visual data corresponding thereto, from the splitter component 112 (or a sensor component associated with the display component, as more fully disclosed herein). The visual image 402 can comprise one or more data overlays, wherein desired (e.g., pertinent or critical) data can be presented along with the other objects (e.g., runway 202, truck 204, building 206, . . . ) depicted in the visual image 402. For example, the visual image 402 can comprise a first data overlay 404 that can be a visual representation of a speed (e.g., velocity) of the aircraft, a second data overlay 406 that can be a visual representation of the altitude of the aircraft, a third data overlay 408 that can be a visual representation of a pitch ladder of the aircraft that can indicate the angle of the nose of the aircraft, and/or a fourth data overlay 410 that can be a visual representation of the direction the aircraft is heading.

Employing the techniques (e.g., optical recognition techniques and algorithms and/or computer-based vision techniques) disclosed herein, the data verification component 114 can analyze and interpret the visual image 402 (and/or corresponding visual data), including analyzing and interpreting the visual representations of the data overlays (e.g., first data overlay 404, second data overlay 406, third data overlay 408, fourth data overlay 410, . . . ) and other visual objects (e.g., runway 202, truck 204, building 206, . . . ) presented in the visual image 402. Based at least in part on the results of the analysis and interpretation of the visual image 402, the data verification component 114 can determine or identify the respective data presented in the data overlays (e.g., 404, 406, 408, 410, . . . ), identify the other respective objects (e.g., runway 202, truck 204, building 206, . . . ) in the visual image 402, determine or identify relationships (e.g., geospatial relationships) between the respective objects with respect to each other and with respect to the aircraft (e.g., determine location and orientation of the runway 202 in relation to the aircraft) in the visual image 402, and/or determine or identify other information in the visual image 402.

For example, based at least in part on the analysis results, including the results of the analysis of the data overlays (e.g., 404, 406, 408, and/or 410, . . . ), the data verification component 114 can determine that the visual image 402 indicates that the speed of the aircraft is 150 knots (kt), the altitude of the aircraft is 1500 feet (ft), the angle of the nose of the aircraft is zero degrees, and/or the direction or heading of the aircraft is 330 degrees.

The data verification component 114 also can receive the processed data from the data processing component 104, wherein the processed data can be the data that was used to generate the visual image 402 (e.g., by the render component 106). The data verification component 114 can analyze and evaluate the data, including the data overlay data (e.g., speed, altitude, pitch ladder, and/or direction of the aircraft), determined or derived from the visual information of the visual image 402 and the processed data and/or other data (e.g., data received from sensors or other sources) that was used to generate the visual image 402 to facilitate determining the accuracy of the data contained in the visual image 402. For instance, the data verification component 114 can compare the data determined or derived from the visual information of the visual image 402 with the processed data and/or other data to determine whether the data of the visual image matches, or at least substantially (e.g., acceptably or suitably) matches, the processed data and/or other data, in accordance with defined matching criteria (e.g., determine whether the comparison results satisfy the defined matching criteria). For example, based at least in part on the comparison results, the data verification component 114 can determine whether the data (e.g., data overlays, 404, 406, 408, and/or 410, . . . ) represented in or derived from the visual image 402 satisfies a defined threshold level of accuracy (e.g., is accurate or is sufficiently accurate enough to satisfy a minimum threshold level of accuracy), in accordance with defined accuracy criteria, which can comprise the defined matching criteria.

If the data verification component 114 determines that the data (e.g., data overlays, 404, 406, 408, and/or 410, . . . ) determined or derived from the visual image 402 matches or at least sufficiently matches the processed data and/or the other data, in accordance with the defined accuracy (e.g., matching) criteria, the data verification component 114 can determine that the visual information presented in the visual image 402 accurately represents the processed data and/or the other data. For example, if the data verification component 114 determines, interprets, or derives from the visual image 402 that the altitude level of the aircraft is 1500 feet (e.g., from analysis and interpretation of the second data overlay 406) and determines that the processed data also indicates that the altitude level of the aircraft is 1500 feet, the data verification component 114 can determine that the second data overlay 406, which can represent the altitude level (e.g., 1500 feet) of the aircraft, as presented in the visual image 402 accurately represents the processed data regarding the altitude level of the aircraft. In such instance where no error in the data presented in the visual image 402 is detected, the data verification component 114 can determine that no responsive action with respect to the visual image 402 is to be taken.

If, however, the data verification component 114 determines that the data (e.g., one or more of the data overlays, 404, 406, 408, and/or 410, . . . ) determined or interpreted from the visual image 402 does not desirably (e.g., acceptably or suitably) match the processed data, in accordance with the defined accuracy (e.g., matching) criteria, the data verification component 114 can take appropriate responsive action to correct or mitigate the error in the data presented in the visual image 402. For example, in response to determining that the altitude level (e.g., 1500 feet) of the aircraft presented in the second data overlay 406 determined or interpreted from the visual image 402 does not match the altitude level (e.g., 1600 feet) of the aircraft included in the processed data and/or the other data, the data verification component 114 can generate an error indicator 412 (e.g., an error icon) that can be presented in the visual image 402 in proximity to the second data overlay 406 relating to the altitude level (e.g., as depicted in FIG. 4), or presented in another desired region (e.g. dedicated error indicator region) of the visual image 402, and/or can perform another desired responsive action (e.g., generate and present a visual or audio alarm regarding the data error; and/or prevent the erroneous data from being presented in the visual image 402) in response to the detected data error.

It is to be appreciated and understood that, while the data verification component 114 and other components of the display and data verification unit 102 are depicted as being included within the display and data verification unit 102, in one or more other embodiments, the data verification component 114 and/or another component(s) of the display and data verification unit 102 can be a stand-alone component(s) or all or a portion of such component can be part of another component(s) that is separate from or part of the display and data verification unit 102.

The disclosed subject matter, by employing the data verification component 114 and the techniques disclosed herein, can desirably (e.g., favorably, optimally, or acceptably) verify the accuracy and reliability of data (e.g., critical data) presented in visual images being displayed to users, and can provide improved verification of the accuracy and reliability of such data, as compared to conventional systems that only verify data up to a point before a visual image is created based on the data. The disclosed subject matter can thereby provide increased reliability of the system, and a reduction in the use of redundant systems that have been employed to compensate for the lack of integrity in the presentation of data (e.g., critical data) via a display screen. The disclosed subject matter also can replace complex and complicated monitors that are currently used to facilitate verifying data.

In some embodiments, the disclosed subject matter, by employing the data processing component 104, the render component 106, the projector component 108, the display component 110, the splitter component 112, and the data verification component 114 in a single unit (e.g., the display and data verification unit 102), can desirably control variables, such as, for example, light, dust, focal length, and/or obstructions, to facilitate achieving accurate results with regard to verifying data being presented in visual images.

Figure 5:
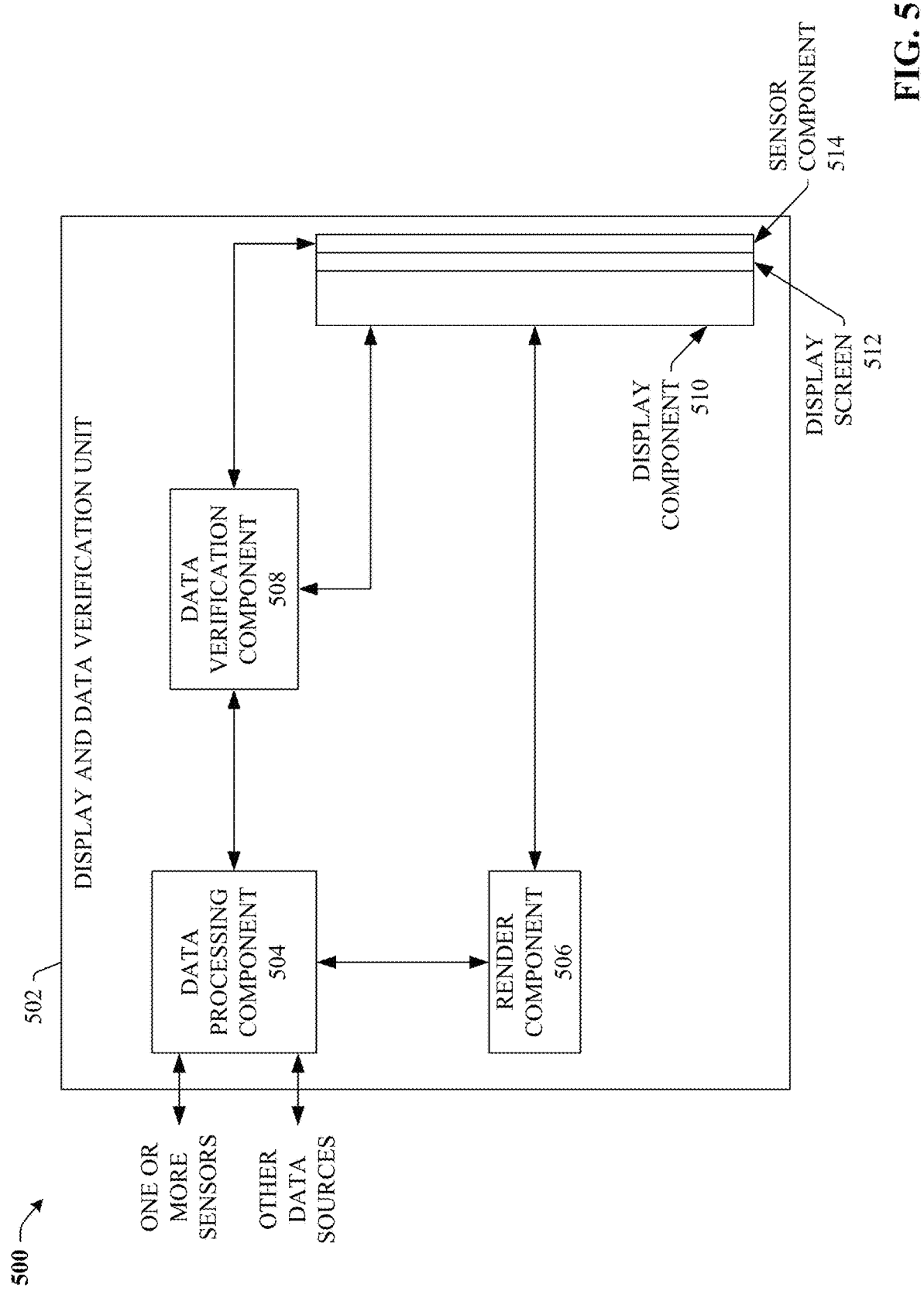
FIG. 5 depicts a block diagram of an example system that can employ a sensor component with a display component to facilitate monitoring and verifying data in a visual image for accuracy, in accordance with one or more embodiments of the disclosed subject matter.

FIG. 5 depicts a block diagram of an example system 500 that can employ a sensor component (e.g., a sensor component comprising a sensor matrix) with a display component to facilitate monitoring and verifying data in a visual image for accuracy, in accordance with one or more embodiments of the disclosed subject matter. The system 500 can comprise a display and data verification unit 502, a data processing component 504, a render component 506, and a data verification component 508, which respectively can comprise the same or similar functionality and/or features, as more fully described herein with regard to respectively named components.

The system 500 also can comprise a display component 510 that can be associated with (e.g., communicatively connected to) the render component 506, and can receive the visual images (e.g., visual data usable to generate and display the visual images) from the render component 506. The display component 510 can generate and/or present (e.g., display) the visual images received from the render component 506, wherein the display component 510 can comprise a display screen 512 via which the visual images can be presented to the user. In accordance with various embodiments, the display component 510 can be or can comprise an LCD or LED display that can be employed to generate and present the visual images to the user.

In some embodiments, the display component 510 can include a sensor component 514 that can be employed to sense visual images being presented by the display screen 512. The sensor component 514 can be integrated with and/or overlaid on the display screen 512. In some implementations, the display screen 512 can comprise a display matrix, wherein respective portions of the display matrix can present respective portions of a visual image. The sensor component 514 can comprise a sensor matrix that can correspond to or at least substantially correspond to the display matrix, wherein the sensor matrix can comprise respective sensor portions (e.g., respective sensors) that can sense the respective portions of the visual image.

The sensor component 514 can be associated with (e.g., communicatively connected to) the data verification component 508. The sensor component 514 can communicate the visual images (e.g., the visual data usable to generate and display the visual images) to the data verification component 508. The data verification component 508 also can be associated with the data processing component 504, and can receive, from the data processing component 504, the processed data and/or other data (e.g., the sensor data and/or other data received by the data processing component 504 from the one or more sensors or other data sources).

With respect to each visual image, the data verification component 508 can analyze and interpret the visual information presented in the visual image, as more fully described. The data verification component 508 can determine or identify the data being presented in the visual image to the user based at least in part on the results of the analyzing and interpreting of the visual information presented in the visual image, as more fully described.

The data verification component 508 also can analyze and evaluate the data determined or derived from the visual information of the visual image and the processed data and/or other data (e.g., data received from sensors or other sources) that was used to generate the visual image to facilitate determining the accuracy of the data contained in the visual image. For example, the data verification component 408 can compare the data determined or derived from the visual information of the visual image with the processed data and/or other data to determine whether the data of the visual image matches, or at least substantially (e.g., acceptably or suitably) matches, the processed data and/or other data, in accordance with the defined matching criteria, as more fully described herein.

If the data verification component 508 determines that certain data determined from the visual image does not desirably (e.g., acceptably or suitably) match the processed data (e.g., if the data verification component 508 determines that there is an error with regard to the certain data), in accordance with the defined matching criteria, the data verification component 508 can perform one or more appropriate responsive actions (e.g., generate and present a notification message or alarm; and/or prevent the display of the visual image or at least the erroneous data in the visual image) to correct or mitigate the error in the certain data presented in the visual image, as more fully described herein.

If, on the other hand, the data verification component 508 determines that the data determined or derived from the visual image desirably matches the processed data and/or the other data, in accordance with the defined matching criteria, the data verification component 508 can determine that the visual information presented in the visual image accurately represents the processed data and/or the other data. In such instance, the data verification component 508 can determine that no responsive action with respect to the visual image is to be taken.

Figure 6:
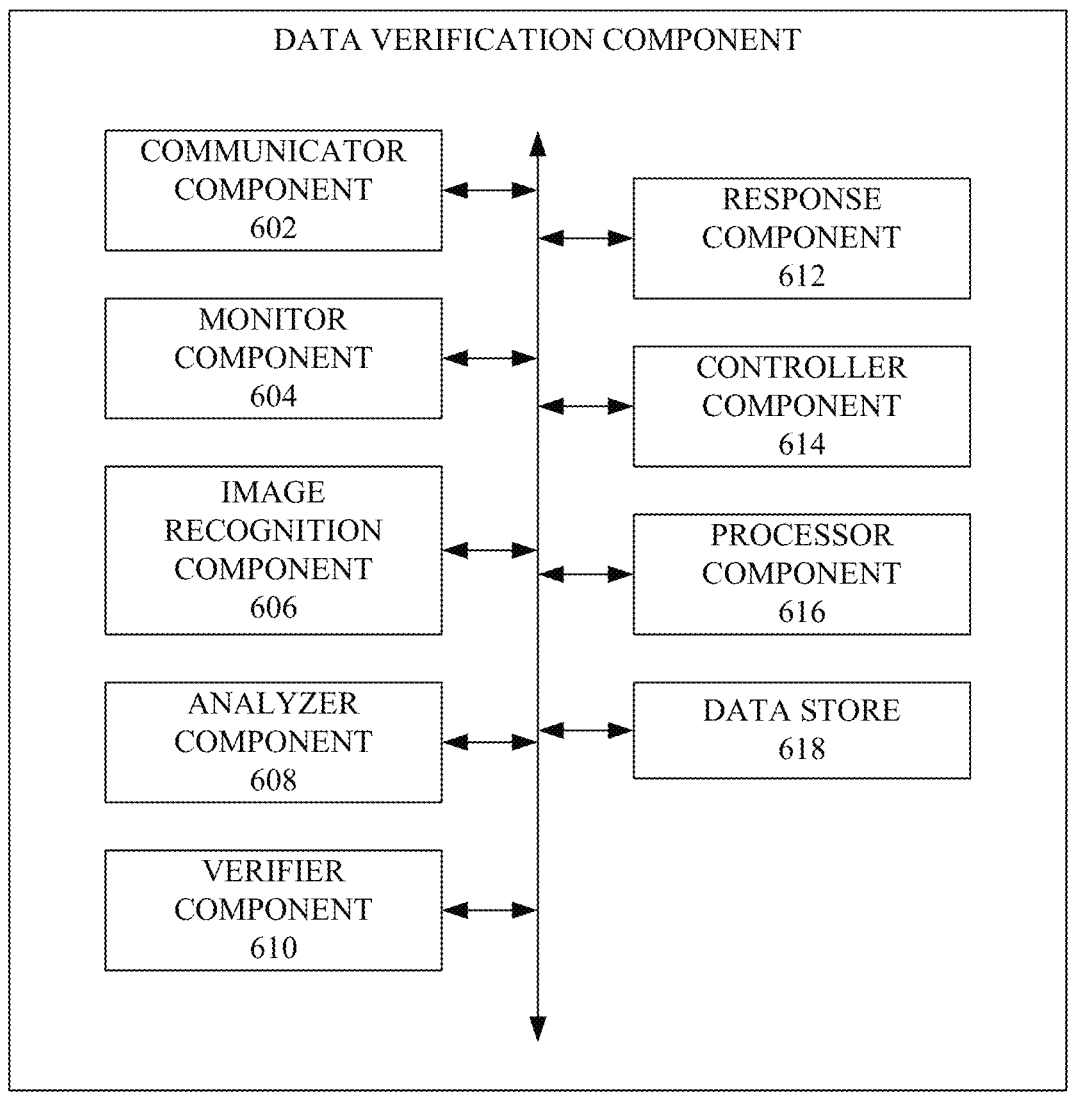
FIG. 6 illustrates a block diagram of an example data verification component, in accordance with one or more embodiments of the disclosed subject matter.

FIG. 6 illustrates a block diagram of an example data verification component 600, in accordance with one or more embodiments of the disclosed subject matter. The data verification component 600 can comprise a communicator component 602 that can communicate information to other components (e.g., display component or projector component) and can receive information from other components (e.g., data processing component, splitter component, sensor component, or display component).

For example, the communicator component 602 can communicate a notification message or alarm indicator to the display component and/or projector component to facilitate presenting a notification or alert to the user via the display component and/or projector component to notify or alert the user that erroneous data was detected in the visual image(s). As another example, the communicator component 602 can communicate a prevention message to the projector component and/or the display component to direct the projector component and/or the display component to not display, or to discontinue displaying, the visual image or subsequent visual images that have been determined to contain erroneous data. As still another example, the communicator component 602 can receive processed data and/or other data (e.g., sensor data from one or more sensors and/or other data from other sources) from the data processing component.

The data verification component 600 also can comprise a monitor component 604 that can monitor and detect visual images being presented to the user via the display component. In some embodiments, the monitor component 604 can comprise an optical monitor component that can detect visual images being projected by the projector component to the display component, wherein the monitor component 604 can receive a portion (e.g., a relatively small portion) of the light energy of the light stream that is carrying the visual images from the splitter component. In other embodiments, a sensor component (e.g., sensor component comprising a sensor matrix) of the display component can detect the visual images being presented by the display component, and the monitor component 604 can receive the visual images (e.g., visual data representing the visual images) from the sensor component of the display component.

The data verification component 600 also can include an image recognition component 606 that can employ one or more image (e.g., optical image), object, character, and/or pattern recognition techniques or algorithms to facilitate analyzing and interpreting visual images, and recognizing and identifying objects, shapes, characters (e.g., alphanumeric characters (e.g., letters, numbers, or data values)), patterns, symbols, and/or other entities in the visual images being presented to the user (and received by the data verification component 600) based at least in part on the results of an analysis and interpretation of the visual images. The image recognition component 606 also can recognize or identify the respective sizes and shapes of the respective objects, symbols, characters, etc., in visual images based at least in part on the results of an analysis and interpretation of the visual images.

The data verification component 600 further can include an analyzer component 608 that can analyze data to facilitate performing various operations of the data verification component 600 or other components associated with the data verification component 600. For example, the analyzer component 608 can operate in conjunction with the image recognition component 606 to analyze visual images and data associated with the visual images to facilitate determining, recognizing, or identifying objects, shapes, characters, patterns, symbols, and/or other entities in the visual images, and determining the data represented in the visual images that is the basis for the objects, shapes, characters, patterns, symbols, and/or other entities in the visual images. As part of the analysis, the analyzer component 608, operating in conjunction with the image recognition component, can interpret the visual images, for example, by interpreting objects, shapes, characters, patterns, symbols, and/or other entities in the visual images using the one or more image, object, character, and/or pattern recognition techniques or algorithms to facilitate determining or deriving the data represented in the visual images.

The data verification component 600 can comprise a verifier component 610 that can facilitate determining whether the data determined or derived from a visual image is accurate. The verifier component 610 can compare the data determined or derived from the visual image with the processed data that was utilized to generate the visual image and/or other data (e.g., sensor data or other data that was used to generate the processed data) to determine whether the data obtained from analysis of the visual image matches or at least sufficiently matches the processed data and/or the other data, in accordance with the defined accuracy criteria, which can comprise the defined matching criteria. Based at least in part on the results of the comparison, the verifier component 610 can determine whether the data obtained from analysis of the visual image is accurate or at least sufficiently accurate, in accordance with the defined accuracy criteria. In some embodiments, the verifier component 610 can employ a comparator component to facilitate performing the data comparisons.

The data verification component 600 can include a response component 612 that can perform one or more response actions to facilitate mitigating data errors and/or preventing the presentation of erroneous data in visual images. For instance, in response to a data error in a visual image being determined by the verifier component 610, the response component 612 can generate a notification message and/or an alarm to facilitate notifying or alerting the user that there is a data error in the visual image. The notification message or alarm can be a generic or high-level notification or alarm that indicates there is a data error in the visual image with relatively minimal details regarding the data error, or can be a more detailed notification or alarm that provides a significant amount of details regarding the data error in the visual image (e.g., type of data error, specify the data that is in error, corrected data to mitigate the data error, and/or location(s) in or part(s) of the visual image where the data error is located, . . . ). In some embodiments, in response to a data error in a visual image being determined by the verifier component 610, the response component 612 can generate a prevention message that can be sent to the display component and/or projector component, via the communicator component 602, wherein, in response to the prevention message, the display component and/or projector component can discontinue the presentation of all or a portion (e.g., portion containing the data error) of the visual image (and/or subsequent visual images in the image stream) that contain the data error.

The data verification component 600 further can comprise a controller component 614 that can control operations relating to processing data, analyzing and interpreting visual images or visual data, determining data represented in visual images, determining whether data represented in a visual image is accurate with respect to processed data and/or other data (e.g., sensor data), performing an appropriate response action to mitigate or prevent presentation of a data error in a visual image, and/or other operations. The controller component 614 can facilitate controlling operations being performed by various components of the data verification component 600, controlling data flow between various components of the data verification component 600, controlling data flow between the data verification component 600 and other components or systems associated with the data verification component 600, etc.

The data verification component 600 can comprise a processor component 616 that can work in conjunction with the other components (e.g., communicator component 602, monitor component 604, image recognition component 606, . . . ) to facilitate performing the various functions of the data verification component 600. The processor component 616 can employ one or more processors, microprocessors, or controllers that can process data, such as information relating to visual images, analyzing or interpreting visual images, recognizing objects or other entities (e.g., alphanumeric characters, symbols, shapes, . . . ) in visual images, comparing data represented in visual images to processed data and/or other data used to generate the visual images, performing response actions to mitigate or prevent data errors in visual images, notification messages, alarms, prevention messages, and/or other information, to facilitate operation of the data verification component 600, as more fully disclosed herein, and control data flow between the data verification component 600 and other components associated with the data verification component 600.

The data verification component 600 also can include a data store 618 that can store data structures (e.g., user data, metadata), code structure(s) (e.g., modules, objects, hashes, classes, procedures) or instructions, information relating to visual images, analyzing or interpreting visual images, recognizing objects or other entities (e.g., alphanumeric characters, symbols, shapes, . . . ) in visual images, comparing data represented in visual images to processed data and/or other data used to generate the visual images, performing response actions to mitigate or prevent data errors in visual images, notification messages, alarms, prevention messages, and/or other information, to facilitate controlling operations associated with the data verification component 600. In an aspect, the processor component 616 can be functionally coupled (e.g., through a memory bus) to the data store 618 in order to store and retrieve information desired to operate and/or confer functionality, at least in part, to communicator component 602, monitor component 604, image recognition component 606, etc., and/or substantially any other operational aspects of the data verification component 600.

It is to be appreciated and understood that, in some embodiments, the disclosed subject matter can employ authentication techniques and protocols to facilitate securing the display and data verification unit and data associated therewith. For instance, the disclosed subject matter can employ an authenticator component that can employ authentication protocols to facilitate security of data associated with a system, a display and data verification unit, and/or a memory (e.g., a data store), in accordance with the disclosed subject matter. For example, the authenticator component can solicit authentication data (e.g., an authentication credential) from an entity (e.g., an application, a user, a device), and, upon the authentication data so solicited, can be employed, individually and/or in conjunction with information acquired and ascertained as a result of biometric modalities employed, to facilitate control access to the memory, the system, the resource, or the application. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example. Additionally and/or alternatively, public key infrastructure (PKI) data can also be employed by the authentication component. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

The authenticator component can implement one or more machine-implemented techniques to identify an entity by its unique physical and behavioral characteristics and attributes. Biometric modalities that can be employed can include, for example, finger print identification that can scan the corrugated ridges of skin that are non-continuous and form a pattern that can provide distinguishing features to identify an entity, face recognition wherein measurements of key points on an entity's face can provide a unique pattern that can be associated with the entity, and iris recognition that measures from the outer edge towards the pupil the patterns associated with the colored part of the eye—the iris—to detect unique features associated with an entity's iris.

In response to verifying that the received authentication data matches stored authentication data relating to the entity, the authenticator component can grant a set of access rights to the system, the display and data verification unit, and/or the memory, in accordance with access rights that the entity is permitted to have. In response to not being able to verify that the received authentication data matches stored authentication data relating to the entity, the authenticator component can deny access rights to the system, the display and data verification unit, and/or the memory, or can grant, to the entity, limited access rights to the system, the display and data verification unit, and/or the memory, wherein the limited access rights can be access rights that are permitted to be granted to non- or un-authorized entities. The authenticator component also can provide an entity with one or more additional opportunities to provide valid authentication data up to a defined maximum number of authentication attempts.

It is also to be understood and appreciated that cryptographic protocols can be employed to facilitate security of data associated with the system, the display and data verification unit, and/or the memory, in accordance with the disclosed subject matter. For example, a cryptographic component (e.g., cryptographic engine) can be employed and can facilitate encrypting and/or decrypting data (e.g., content, content-related information, entity-related information) to facilitate securing data being written to, stored in, and/or read from the memory, and/or data being communicated to or from the system. The cryptographic component can provide symmetric cryptographic tools and accelerators (e.g., Twofish, Blowfish, AES, TDES, IDEA, CASTS, RC4, etc.) to ensure that the system, the display and data verification unit, and/or the memory, or portions thereof, can only be accessed by those entities authorized and/or authenticated to do so. The cryptographic component can also provide asymmetric cryptographic accelerators and tools (e.g., RSA, Digital Signature Standard (DSS), and the like) to ensure that the system, the display and data verification unit, and/or the memory (e.g., a specified partition in the memory), or portions thereof, only can be accessed by those entities that are authorized and certified to do so. Additionally, the cryptographic component can provide accelerators and tools (e.g., Secure Hash Algorithm (SHA) and its variants such as, for example, SHA-0, SHA-1, SHA-224, SHA-256, SHA-384, and SHA-512) to ensure that access to the system, the display and data verification unit, and/or the memory, or portions thereof, is confined to those entities authorized to gain access.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 7:
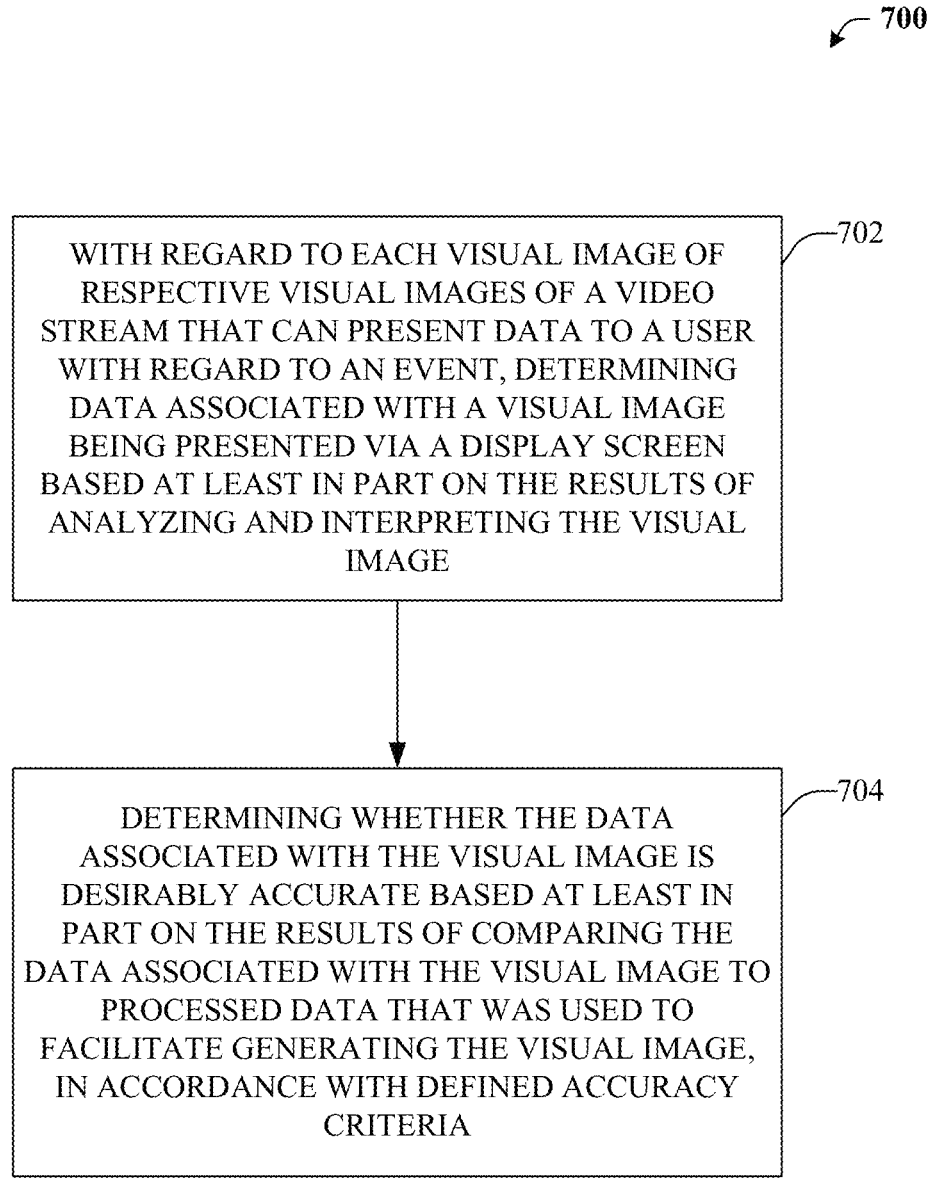
FIG. 7 presents a flow diagram of an example method for verifying data in a visual image for accuracy, in accordance with one or more embodiments and aspects of the disclosed subject matter.
Figure 8:
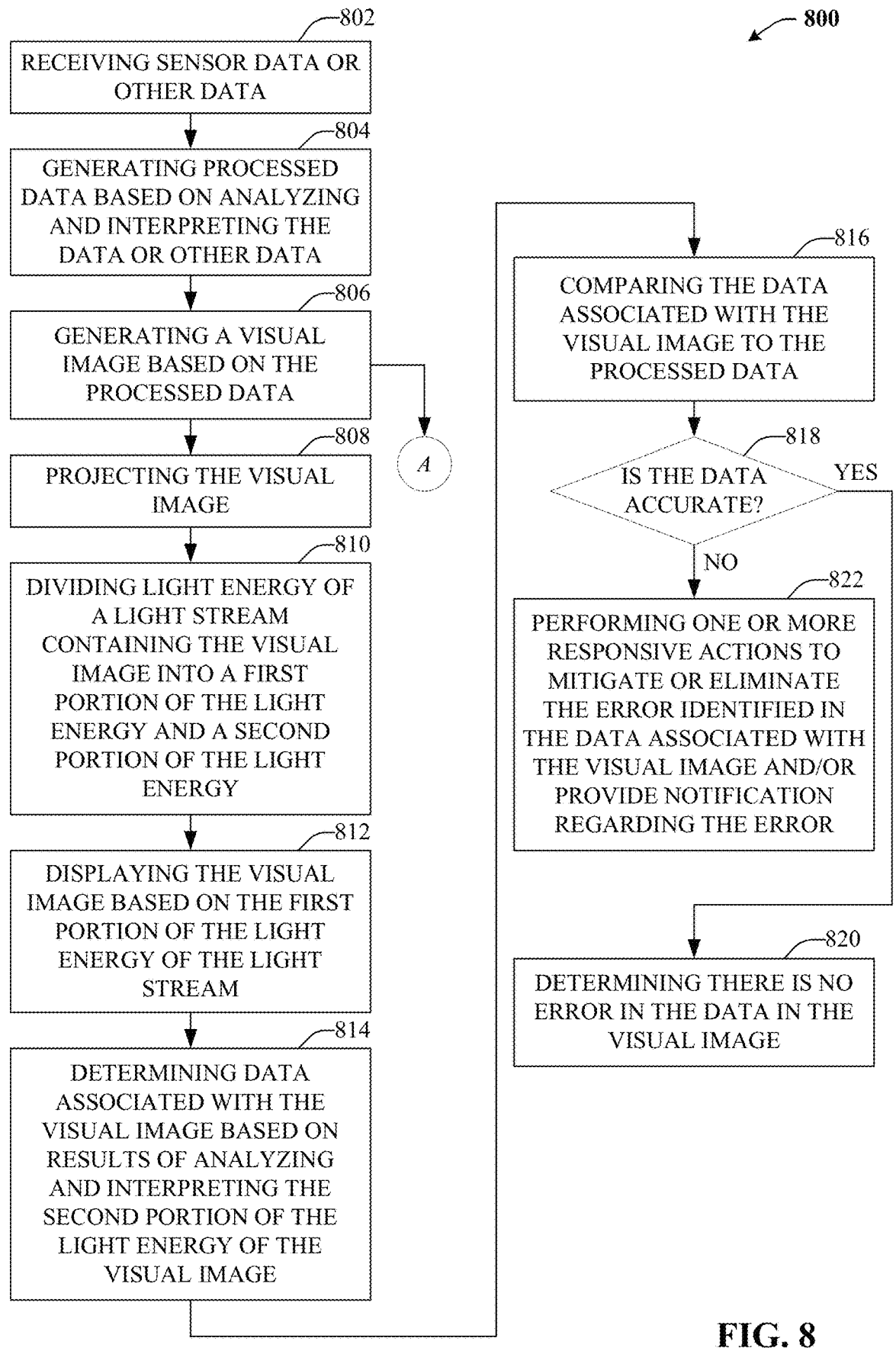
FIG. 8 depicts a flow diagram of another example method for verifying data in a visual image for accuracy, in accordance with one or more embodiments and aspects of the disclosed subject matter.
Figure 9:
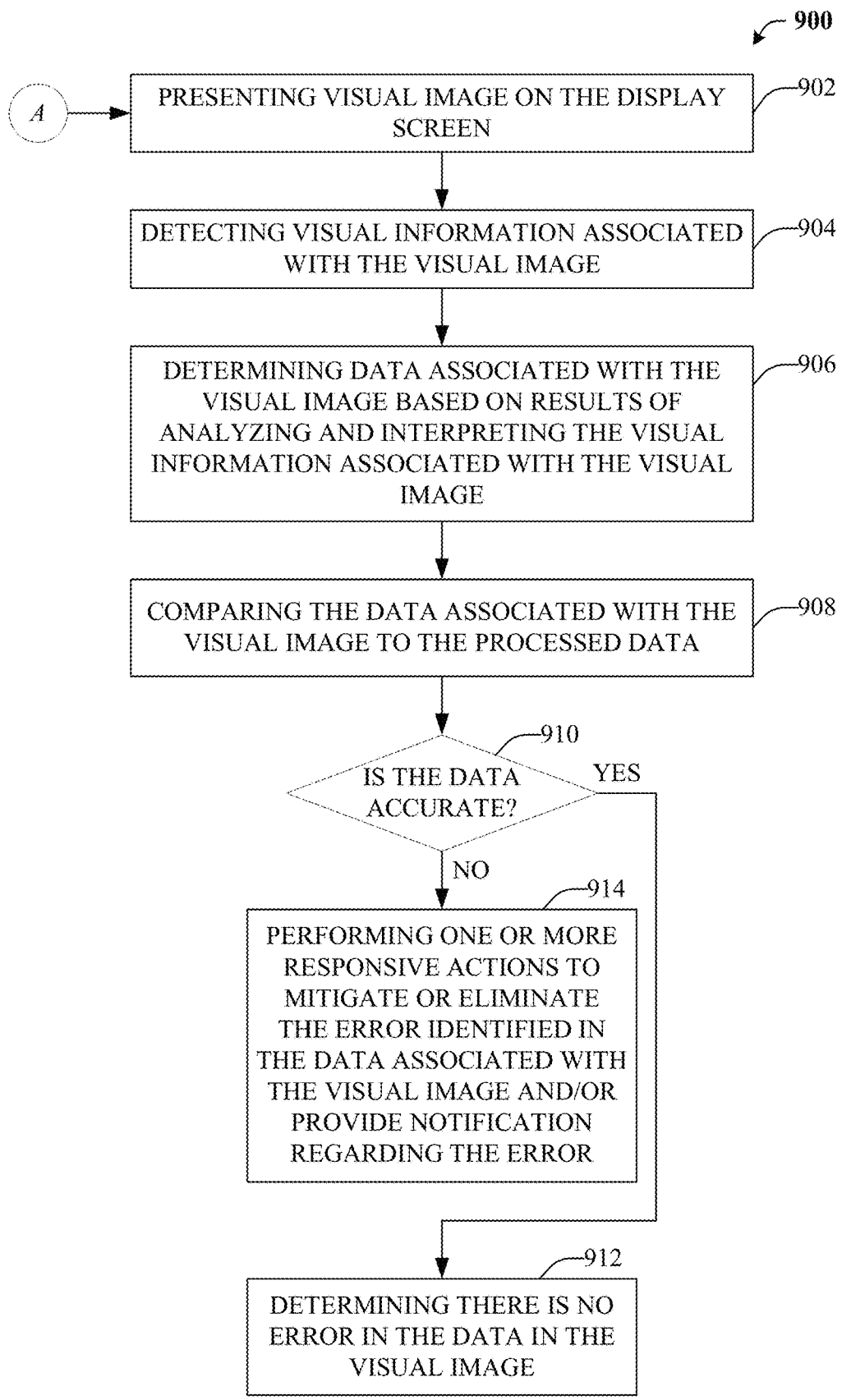
FIG. 9 depicts a flow diagram of another example method for verifying data in a visual image for accuracy using a sensor component to facilitate sensing the visual image presented via a display component, in accordance with one or more embodiments of the disclosed subject matter.

FIGS. 7-9 illustrate methods and/or flow diagrams in accordance with the disclosed subject matter. For simplicity of explanation, the methods are depicted and described as a series of acts. It is to be understood and appreciated that the disclosed subject matter is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or storage media.

Referring to FIG. 7, illustrated is a flow diagram of an example method 700 for verifying data in a visual image for accuracy, in accordance with one or more embodiments of the disclosed subject matter. As an example, the method 700 can be employed by a data verification component.

At reference numeral 702, with regard to each visual image of respective visual images of a video stream that can present data to a user with regard to an event (e.g., an event involving a vehicle, a power plant, a medical system), data associated with (e.g., contained in, presented by) a visual image being presented via a display screen can be determined based at least in part on the results of analyzing and interpreting the visual image. The data verification component can receive a portion of the light energy of the visual image from the splitter component or visual information representing the visual image from a sensor component (e.g., sensor component comprising a sensor matrix) associated with a display screen. The data verification component can analyze and interpret the visual information presented in the visual image, as disclosed herein. Based at least in part on the results of the analysis and interpretation of the visual information presented in the image, the data verification component can determine or identify the data being presented in the visual image, as more fully described herein.

At reference numeral 704, a determination can be made regarding whether the data associated with the visual image is desirably accurate based at least in part on the results of comparing the data associated with the visual image to processed data that was used to facilitate generating the visual image, in accordance with defined accuracy criteria. The data verification component can receive the processed data and/or other data (e.g., the data received from the sensors or other sources).

The data verification component can evaluate the data associated with the visual image with respect to the processed data that was used to facilitate generating the visual image and/or the other data. For instance, the data verification component can compare the data associated with the visual image with the processed data and/or the other data. Based at least in part on the results of the comparison, the data verification component can determine whether the data associated with the visual image is desirably (e.g., acceptably or suitably) accurate, in accordance with defined accuracy criteria.

If the data verification component determines that the data associated with the visual image does not match the processed data, the data verification component can take appropriate responsive action to correct or mitigate the error in the data presented in the visual image, wherein the responsive action can comprise generating and presenting a notification message (e.g., a visual error notification message), generating and presenting an alert indicator, and/or preventing presentation of all or a portion of the visual image that has erroneous data, as more fully described herein.

FIG. 8 presents a flow diagram of another example method 800 for verifying data in a visual image for accuracy, in accordance with one or more embodiments and aspects of the disclosed subject matter. As an example, the method 800 can be employed by a display and data verification unit comprising a data verification component.

At reference numeral 802, sensor data and/or other data can be received from one or more sensors and/or other data sources. The display and data verification unit can receive data (e.g., sensor data) from one or more sensors and/or one or more other data sources associated with the display and data verification unit.

At reference numeral 804, processed data can be generated based at least in part on analyzing and interpreting the data and/or the other data, to facilitate generating a visual image. A data processing system of the display and data verification unit can analyze and interpret the data and/or the other data, and can generate processed data based at least in part on the results of the analyzing and the interpreting of the data and/or the other data. The processed data can comprise or represent the data and/or the other data, and/or can comprise derived data that can be determined or derived by the data processing system based at least in part on the results of the analyzing and the interpreting of the data and/or the other data.

With respect to each visual image of a set of visual images of an event, at reference numeral 806, a visual image can be generated based at least in part on the processed data. A render component of the display and data verification unit can generate the visual image based at least in part on the processed data. The visual image can comprise or visually represent all or a portion of the data and/or the other data, and/or can comprise or visually represent the derived data. At this point, in some embodiments, the method 800 can continue to reference numeral 808 and can proceed from that point. In other embodiments, the method 800 can proceed to reference point A, wherein the method 900 can proceed from reference point A.

At reference numeral 808, the visual image can be projected. In some embodiments, the display and data verification unit can include a projector component. The projector component can project a light stream that can comprise the visual image based at least in part on the visual image received from the render component.

At reference numeral 810, light energy of a light stream containing the visual image can be divided into a first (e.g., larger) portion of the light energy and a second (e.g., relatively smaller) portion of the light energy. The display and data verification unit can comprise a splitter component that can divide (e.g., split, apportion, or distribute) the first portion of the light energy of the light stream containing the visual image and the second portion of the light energy. The splitter component can direct the first portion of the light energy to the display component of the display and data verification unit, and can direct the second portion of the light energy to the data verification component.

At reference numeral 812, the visual image can be displayed based at least in part on the first portion of the light energy of the light stream containing the visual image. The display component can receive the first portion of the light energy from the splitter component, wherein the visual image can be displayed by the display component based at least in part on the interaction of the first portion of the light energy with the display component.

At reference numeral 814, data associated with the visual image can be determined based at least in part on results of analyzing and interpreting the second portion of the light energy of the visual image. The data verification component can analyze and interpret the second portion of the light energy (e.g., visual information contained in the second portion of the light energy) of the visual image. Based at least in part on the results of the analyzing and interpreting the second portion of the light energy of the visual image, the data verification component can determine the data associated with the visual image, as more fully disclosed herein. Such data can be data directly presented in the visual image, such as data values explicitly displayed in the visual image or can comprise other data that can be derived from the analyzing and interpreting of the visual image and objects and object relationships that are visually depicted in the visual image.

At reference numeral 816, the data associated with the visual image can be compared to the processed data and/or the received data (e.g., sensor data and/or other data) to facilitate determining whether the data associated with the visual image is accurate. The data verification component can compare the data associated with the visual image to the processed data and/or the received data to facilitate determining whether the data associated with the visual image is accurate. For instance, the data verification component can compare the data associated with the visual image to the processed data and/or the received data to facilitate determining whether the data associated with the visual image sufficiently matches the processed data and/or the received data to satisfy the defined accuracy criteria, which can comprise the defined matching criteria.

At reference numeral 818, a determination can be made regarding whether the data associated with the visual image is accurate with respect to the processed data and/or the received data based at least in part on the results (e.g., comparison results) of the comparing of the data associated with the visual image to the processed data and/or the received data. The data verification component can determine whether the data associated with the visual image is sufficiently accurate with respect to the processed data and/or the received data based at least in part on the comparison results.

If, at reference numeral 818, it is determined that the data associated with the visual image is accurate (e.g., sufficiently accurate), in accordance with the defined accuracy criteria, at reference numeral 820, it can be determined that there is no error in the data associated with the visual image. The data verification component can determine that there is no error (or at least no significant or material error) in the data associated with the visual image and no responsive action with respect to the visual image has to be performed, in response to determining that the data associated with the visual image is accurate (e.g., sufficiently accurate), in accordance with the defined accuracy criteria.

If, at reference numeral 818, it is determined that the data associated with the visual image is not accurate, based at least in part on the comparison results and the defined accuracy criteria, at reference numeral 822, one or more responsive actions can be performed to mitigate or eliminate the error identified in the data associated with the visual image and/or provide notification regarding the error identified in the data associated with the visual image. In response to determining that the data associated with the visual image is not accurate (e.g., not sufficiently accurate), based at least in part on the comparison results and the defined accuracy criteria, the data verification component can perform or facilitate performing one or more responsive actions to mitigate or eliminate the error identified in the data associated with the visual image and/or provide notification (e.g., to the user viewing the visual image) regarding the error identified in the data associated with the visual image. The one or more responsive actions can comprise a notification message and/or an alarm that can facilitate notifying the user that there is an error in the data associated with the visual image and/or an action to prevent the display of all or a portion of the visual image associated with the error(s) in the data associated with the visual image, as more fully disclosed herein.

With regard to FIG. 9, depicted is a flow diagram of an example method 900 for verifying data in a visual image for accuracy using a sensor component to facilitate sensing the visual image presented via a display component, in accordance with one or more embodiments of the disclosed subject matter. As an example, the method 900 can be employed by a display and data verification unit comprising a data verification component. In some embodiments, the method 900 can proceed from reference point A of the method 800.

With respect to each visual image of a set of visual images of an event, at reference numeral 902, visual image can be presented on the display screen. The display component of the display and data verification unit can present (e.g., display) the visual image on the display screen. The display component can comprise a display screen that can include a display matrix that can comprise display portions that can respectively display respective portions of the visual image.

At reference numeral 904, visual information associated with the visual image can be detected. In some embodiments, the display and data verification unit can comprise a sensor component that can comprise a sensor matrix, wherein respective sensor portions (e.g., respective sensors) of the sensor matrix can correspond to the respective display portions of the display screen of the display component. The sensor component can sense the respective portions of visual information of the visual image being presented via the respective display portions of the display matrix.

At reference numeral 906, data associated with the visual image can be determined based at least in part on results of analyzing and interpreting the visual information associated with the visual image. The data verification component can analyze and interpret the visual information associated with the visual image. Based at least in part on the results of the analyzing and interpreting of the visual information, the data verification component can determine the data associated with the visual image, as more fully disclosed herein. Such data can be data directly presented in the visual image, such as data values explicitly displayed in the visual image and/or can comprise other data that can be derived from the analyzing and interpreting of the visual image and objects and object relationships that are visually depicted in the visual image.

At reference numeral 908, the data associated with the visual image can be compared to the processed data and/or the received data (e.g., sensor data and/or other data) to facilitate determining whether the data associated with the visual image is accurate. The data verification component can compare the data associated with the visual image (e.g., data determined from analyzing and interpreting the visual image) to the processed data and/or the received data to facilitate determining whether the data associated with the visual image is accurate. For example, the data verification component can compare the data associated with the visual image to the processed data and/or the received data to facilitate determining whether the data associated with the visual image sufficiently matches the processed data and/or the received data to satisfy the defined accuracy criteria.

At reference numeral 910, a determination can be made regarding whether the data associated with the visual image is accurate with respect to the processed data and/or the received data based at least in part on the results of the comparing of the data associated with the visual image to the processed data and/or the received data. The data verification component can determine whether the data associated with the visual image is sufficiently accurate with respect to the processed data and/or the received data based at least in part on the comparison results.

If, at reference numeral 910, it is determined that the data associated with the visual image is accurate, in accordance with the defined accuracy criteria, at reference numeral 912, it can be determined that there is no error in the data associated with the visual image. The data verification component can determine that there is no error, or at least no significant or material error, in the data associated with the visual image and no responsive action with respect to the visual image has to be performed, in response to determining that the data associated with the visual image is accurate (e.g., sufficiently accurate), in accordance with the defined accuracy criteria.

If, at reference numeral 910, it is determined that the data associated with the visual image is not accurate, based at least in part on the comparison results and the defined accuracy criteria, at reference numeral 914, one or more responsive actions can be performed to mitigate or eliminate the error identified in the data associated with the visual image and/or provide notification regarding the error identified in the data associated with the visual image. In response to determining that the data associated with the visual image is not accurate (e.g., not sufficiently accurate), based at least in part on the comparison results and the defined accuracy criteria, the data verification component can perform or facilitate performing one or more responsive actions to mitigate or eliminate the error identified in the data associated with the visual image and/or provide notification (e.g., to the user viewing the visual image) regarding the error identified in the data associated with the visual image, as more fully disclosed herein.

Figure 10:
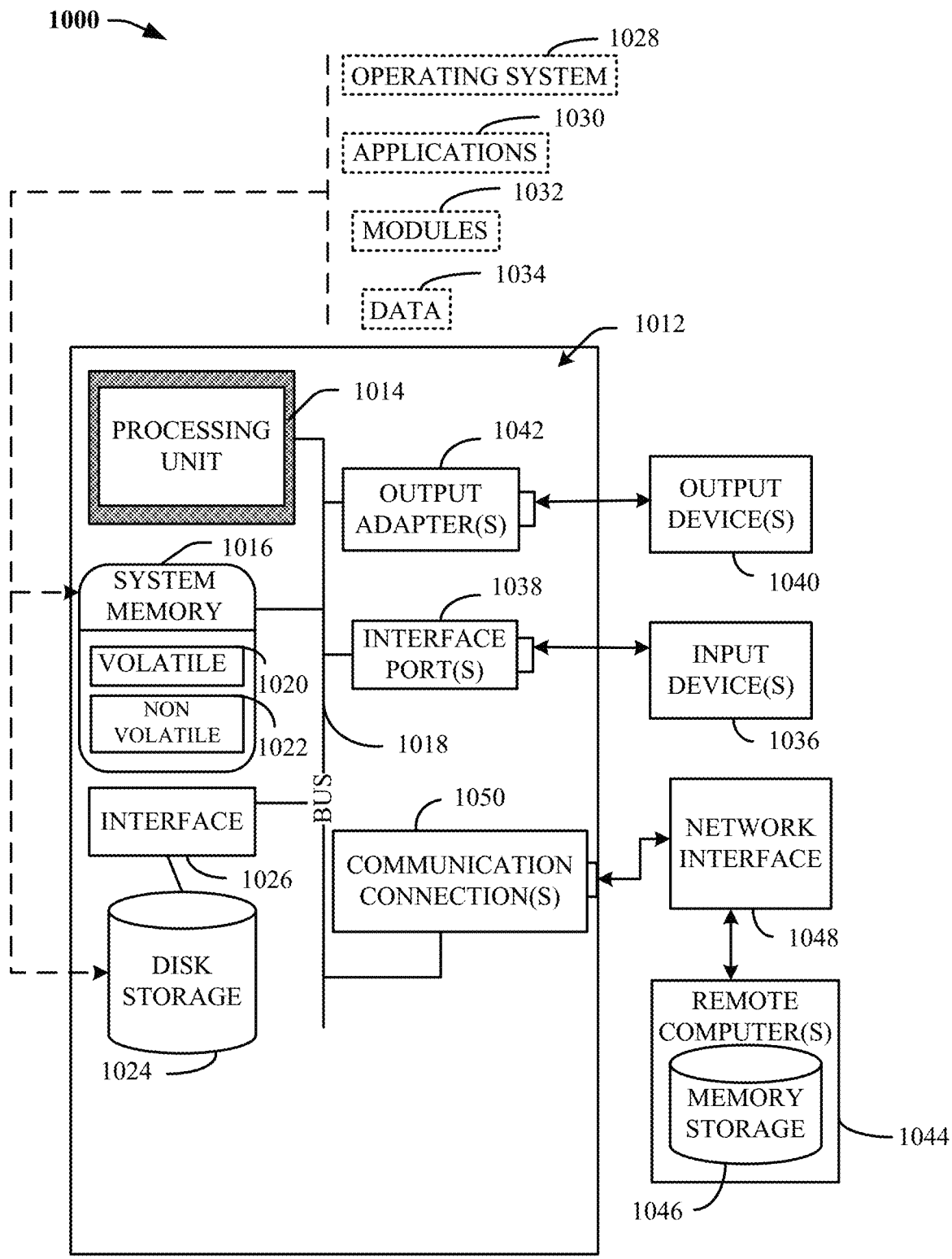
FIG. 10 is a schematic block diagram illustrating a suitable operating environment.
Figure 11:
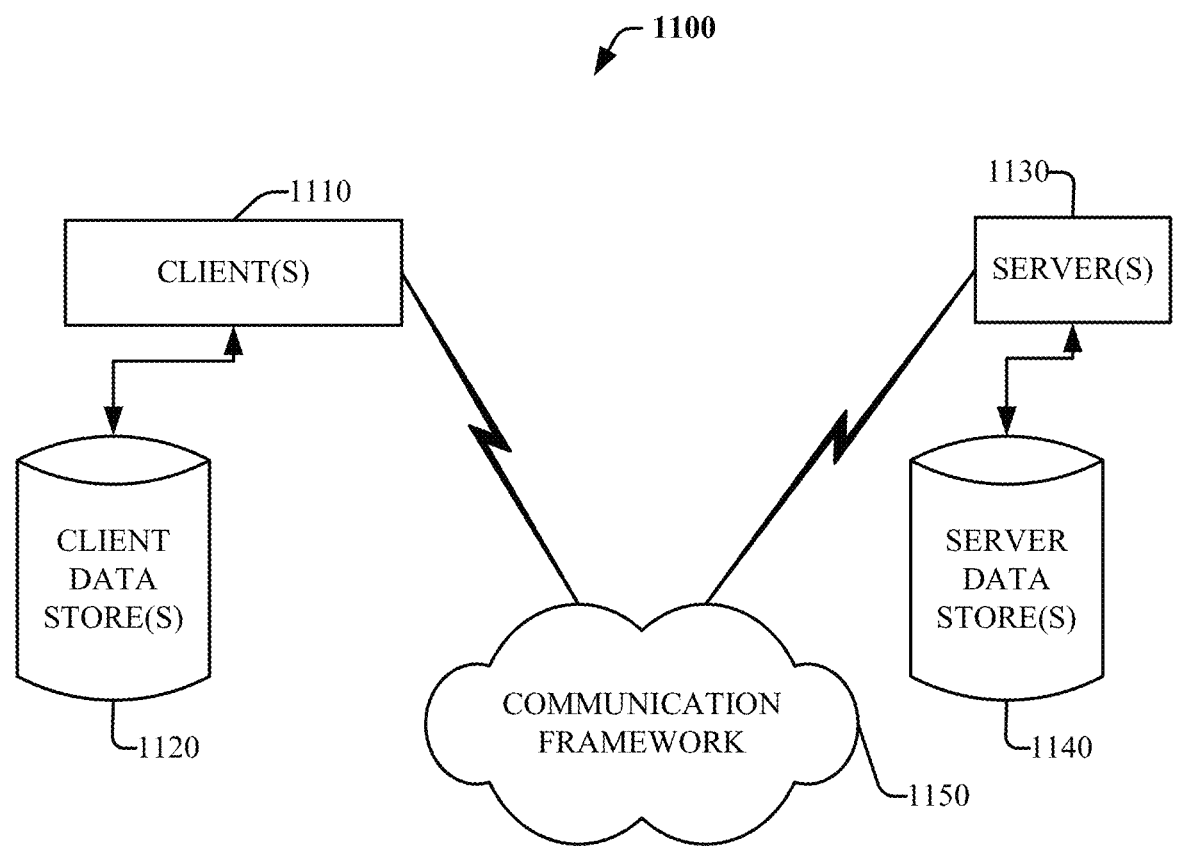
FIG. 11 is a schematic block diagram of a sample-computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented.

With reference to FIG. 10, a suitable environment 1000 for implementing various aspects of this disclosure includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM). Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), Rambus dynamic RAM, and ferroelectric RAM (FeRAM).

Computer 1012 also includes removable/non-removable, volatile/nonvolatile computer storage media. FIG. 10 illustrates, for example, a disk storage 1024. Disk storage 1024 includes, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used, such as interface 1026.

FIG. 10 also depicts software that acts as an intermediary between users and the basic computer resources described in the suitable operating environment 1000. Such software includes, for example, an operating system 1028. Operating system 1028, which can be stored on disk storage 1024, acts to control and allocate resources of the computer system 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 with which the subject matter of this disclosure can interact. The system 1100 includes one or more client(s) 1110. The client(s) 1110 can be hardware and/or software (e.g., threads, processes, computing devices). The system 1100 also includes one or more server(s) 1130. Thus, system 1100 can correspond to a two-tier client server model or a multi-tier model (e.g., client, middle tier server, data server), amongst other models. The server(s) 1130 can also be hardware and/or software (e.g., threads, processes, computing devices). The servers 1130 can house threads to perform transformations by employing this disclosure, for example. One possible communication between a client 1110 and a server 1130 may be in the form of a data packet transmitted between two or more computer processes.

The system 1100 includes a communication framework 1150 that can be employed to facilitate communications between the client(s) 1110 and the server(s) 1130. The client(s) 1110 are operatively connected to one or more client data store(s) 1120 that can be employed to store information local to the client(s) 1110. Similarly, the server(s) 1130 are operatively connected to one or more server data store(s) 1140 that can be employed to store information local to the servers 1130.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "unit," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
    with regard to a visual image relating to an event, projecting, by a system comprising a processor, the visual image towards a display screen;
    after the projecting of the visual image towards the display screen and prior to the presentation of the visual image on the display screen, dividing, by the system, light energy of the visual image to generate a first portion of the light energy of the visual image and a second portion of the light energy of the visual image;
    emitting, by the system, the first portion of the light energy of the visual image to the display screen to facilitate displaying the visual image on the display screen;
    emitting, by the system, the second portion of the light energy of the visual image to a data verification component to facilitate verifying data represented in the visual image;
    in connection with the light energy of the visual image being emitted to the display screen for presentation of the visual image via the display screen, determining, by the system, the data, comprising a visual representation of alphanumeric characters, presented in visual information presented in the visual image being presented via the display screen, based at least in part on results of analyzing at least the second portion of the light energy of the visual image and interpreting the visual information in at least the second portion of the light energy of the visual image, wherein the light energy of the visual image is generated to comprise a representation of processed data that was used to generate the visual image, and wherein the representation comprises the visual information; and
    determining, by the system comprising the data verification component, whether the data, comprising the visual representation of the alphanumeric characters, presented in the visual information presented in the visual image satisfies a defined threshold level of accuracy based at least in part on a comparison result of comparing the data, comprising the visual representation of the alphanumeric characters, presented in the visual information to the processed data, comprising alphanumeric character data corresponding to the alphanumeric characters, that was used to generate the visual image, in accordance with a defined accuracy criterion.

2. The method of claim 1, further comprising:
    analyzing, by the system, sensor data received from one or more sensors, wherein the analyzing of the sensor data comprises interpreting the sensor data;
    generating, by the system, the processed data based at least in part on an analysis result from the analyzing of the sensor data; and
    generating, by the system, the visual image based at least in part on the processed data.

3. The method of claim 1, wherein the first portion of the light energy is larger than the second portion of the light energy.

4. The method of claim 1, further comprising:
    analyzing, by the system, the visual image to facilitate determining at least one of an object, a shape, a data value, an alphanumeric character, a symbol, or an entity depicted in the visual image, wherein the analyzing comprises interpreting at least one of the object, the shape, the data value, the alphanumeric character, the symbol, or the entity depicted in the visual image,
    wherein the determining of the data comprises determining the data represented by the visual information presented in the visual image based at least in part on the interpreting of at least one of the object, the shape, the data value, the alphanumeric character, the symbol, or the entity depicted in the visual image, and wherein the alphanumeric characters comprise the alphanumeric character.

5. The method of claim 1, further comprising:
    comparing, by the system, the data associated with the visual information presented in the visual image to the processed data that was used to generate the visual image to generate the comparison result; and
    determining, by the system, whether the data associated with the visual information presented in the visual image satisfies a match parameter with respect to the processed data based at least in part on the comparison result, in accordance with a defined matching criterion that indicates when the data sufficiently matches the processed data to satisfy the match parameter.

6. The method of claim 5, further comprising:
    in response to determining that the data does not satisfy the match parameter, determining, by the system, that there is an error in the data; and
    determining, by the system, a response action to perform to mitigate the error in the data.

7. The method of claim 6, further comprising:
    performing, by the system, the response action to mitigate the error, wherein the performing of the response action comprises at least one of:
        communicating a notification message or an alarm to facilitate notifying a user viewing the visual image of the error in the data associated with the visual image, or
        discontinuing presentation of the visual image.

8. The method of claim 5, further comprising:
    in response to determining that the data satisfies the match parameter, determining, by the system, that the data satisfies the defined threshold level of accuracy, in accordance with the defined accuracy criterion.

9. The method of claim 1, wherein the visual image relates to at least one of an aircraft, a train, a ship, a truck, an automobile, a power plant, a medical system, or a medical procedure.

10. A system, comprising:
    a memory that stores computer-executable components; and
    a processor that executes computer-executable components stored in the memory, wherein the computer executable-components comprise:

a projector component that projects a light stream comprising a visual image towards a display screen to facilitate display of the visual image on the display screen, wherein the light stream comprises light energy;

a splitter component that, after the projecting of the light stream comprising the visual image towards the display screen and before the display of the visual image on the display screen, apportions the light energy to form a first portion of the light energy and a second portion of the light energy, and distributes the first portion of the light energy of the visual image to the display screen and the second portion of the light energy of the visual image to a data verification component, wherein the first portion is larger than the second portion;

a data processing component that generates processed data based at least in part on sensor data received from one or more sensors, wherein the visual image of a set of visual images is generated based at least in part on the processed data; and the data verification component that, with regard to the light energy of the visual image being emitted to the display screen for display of the visual image via the display screen, determines data, comprising a visual depiction of alphanumeric characters, represented in visual information presented in the visual image based at least in part on results of an analysis of at least the second portion of the light energy of the visual image and interpretation of the visual information in at least the second portion of the light energy of the visual image, wherein the light energy of the visual image comprises a representation of the processed data that was used to generate the visual image, wherein the representation comprises the visual information, and wherein the data verification component determines whether the data represented in the visual information is accurate with respect to the processed data based at least in part on a comparison result of a comparison of the data, comprising the visual depiction of the alphanumeric characters, represented in the visual information to the processed data, comprising alphanumeric character data, in accordance with a defined accuracy criterion.

11. The system of claim 10, wherein the data processing component analyzes and interprets the sensor data, and determines the processed data based at least in part on analysis and interpretation results from the analysis and the interpretation of the sensor data.

12. The system of claim 10, wherein the computer executable-components further comprise a render component that renders the visual image based at least in part on the processed data.

13. The system of claim 10, wherein the visual image comprises at least one data overlay, comprising the data, and objects, and wherein the data verification component determines the data presented in the at least one data overlay, identifies the objects in the visual image, and determines geospatial relationships between the objects based at least in part on the results of the analysis of at least the second portion of the light energy of the visual image.

14. The system of claim 10, further comprising:
a display component that comprises the display screen that presents the visual image, wherein is positioned between, and is at least substantially aligned with, the projector component and the display component.

15. The system of claim 10, wherein, to facilitate determining or deriving the data represented in the visual information presented in the visual image, the data verification component analyzes and interprets the visual image or visual information representing the visual image to identify at least one of an object, a shape, a data value, an alphanumeric character, a symbol, or an entity presented in the visual image, and wherein the alphanumeric characters comprise the alphanumeric character.

16. The system of claim 10, wherein the data verification component compares the data represented in the visual information presented in the visual image to the processed data to generate the comparison result that indicates whether the data matches the processed data.

17. The system of claim 10, wherein, in response to determining that the data represented in the visual information presented in the visual image does not match the processed data, the data verification component determines that there is an error in the data, and determines a response action to perform to alleviate the error in the data.

18. The system of claim 17, wherein the data verification component facilitates performance of the response action comprising at least one of ceasing presentation of the visual image or communication of a notification message or an alert indicator to facilitate notifying a user viewing the visual images of the error in the data.

19. A non-transitory machine-readable medium, comprising executable instructions that, when executed by a processor, facilitate performance of operations, comprising:
with regard to a visual image relating to an event, projecting the visual image towards a display screen;

after the projecting of the visual image towards the display screen and prior to the presentation of the visual image on the display screen, dividing light energy of the visual image to generate a first portion of the light energy of the visual image and a second portion of the light energy of the visual image;

emitting the first portion of the light energy of the visual image to the display screen to facilitate displaying the visual image on the display screen;

emitting the second portion of the light energy of the visual image to a data verification component to facilitate verifying data represented in the visual image;

generating processed data based at least in part on analyzing and interpreting sensor data received from one or more sensors;

in connection with the light energy of the visual image of respective visual images being emitted to the display screen for display of the visual image via the display screen, identifying data, comprising a visual representation of a second version of alphanumeric characters, represented in visual information presented in the visual image being presented for display via the display screen, based at least in part on results of analyzing at least the second portion of the light energy of the visual image and interpreting the visual information in at least the second portion of the light energy of the visual image, wherein the visual image is generated based at least in part on the processed data, wherein the light energy of the visual image is produced as a representation of the processed data that was used to generate the visual image, and wherein the representation comprises the visual information; and determining, by the data verification component, whether the data represented in the visual information is accurate with respect to the processed data based at least in part on a comparison result of comparing the data, comprising the visual representation of the second version of the alphanumeric characters, represented in the visual information to the processed data, comprising a first version of the alphanumeric characters, in accordance with a defined accuracy criterion.

20. A system, comprising:
a memory that stores computer-executable components; and
a processor that executes computer-executable components stored in the memory, wherein the computer executable-components comprise:
  a display component that comprises a display screen that presents a visual image;
  a data processing component that generates processed data based at least in part on sensor data received from one or more sensors, wherein a visual image of a set of visual images is generated based at least in part on the processed data;
  a sensor component that comprises a set of sensors, wherein the set of sensors is overlaid on and integrated with the display screen and senses the visual image being emitted from the display screen, comprising sensing visual information presented in the visual image, based at least in part on the sensing of the visual image, and communicates the visual information to a data verification component to facilitate determining whether data represented in the visual information presented in the visual image is accurate with respect to the processed data; and
  the data verification component that, with regard to light energy of the visual image being emitted by the display screen for display of the visual image via the display screen, determines the data, comprising a visual depiction of alphanumeric characters, represented in the visual information presented in the visual image based at least in part on results of an analysis of at least a portion of the light energy of the visual image and interpretation of the visual information in at least the portion of the light energy of the visual image, wherein the light energy of the visual image comprises a representation of the processed data that was used to generate the visual image, wherein the representation comprises the visual information, and wherein the data verification component determines whether the data represented in the visual information is accurate with respect to the processed data based at least in part on a comparison result of a comparison of the data, comprising the visual depiction of the alphanumeric characters, represented in the visual information to the processed data, comprising alphanumeric character data, in accordance with a defined accuracy criterion.

* * * * *